| (12) | United States Patent | (10) Patent No.: | US 9,860,125 B2 |
|---|---|---|---|
| | Teraoka | (45) Date of Patent: | Jan. 2, 2018 |

(54) NETWORK SYSTEM, NODE, NETWORK MANAGEMENT METHOD, AND COMPUTER-READABLE RECORDING MEDIUM

(71) Applicant: NEC SOLUTION INNOVATORS, LTD., Tokyo (JP)

(72) Inventor: Kenji Teraoka, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 46 days.

(21) Appl. No.: 14/772,584

(22) PCT Filed: Feb. 10, 2014

(86) PCT No.: PCT/JP2014/053022
§ 371 (c)(1),
(2) Date: Sep. 3, 2015

(87) PCT Pub. No.: WO2014/136531
PCT Pub. Date: Sep. 12, 2014

(65) Prior Publication Data
US 2016/0013981 A1   Jan. 14, 2016

(30) Foreign Application Priority Data

Mar. 6, 2013   (JP) .................................. 2013-043742

(51) Int. Cl.
*H04L 12/24* (2006.01)
*H04L 12/46* (2006.01)
(Continued)

(52) U.S. Cl.
CPC ........ *H04L 41/0816* (2013.01); *H04L 12/462* (2013.01); *H04L 41/0896* (2013.01); *H04L 45/025* (2013.01); *H04L 45/28* (2013.01)

(58) Field of Classification Search
CPC .................................................. H04L 41/0816
See application file for complete search history.

(56) References Cited

U.S. PATENT DOCUMENTS

| 2007/0237097 | A1* | 10/2007 | Maharana | ............ H04L 12/462 370/255 |
|---|---|---|---|---|
| 2008/0101227 | A1* | 5/2008 | Fujita | ..................... H04L 45/12 370/232 |
| 2009/0055521 | A1 | 2/2009 | Nakatsuru | |

FOREIGN PATENT DOCUMENTS

| CN | 101039275 A | 9/2007 |
|---|---|---|
| CN | 101552936 A | 10/2009 |

(Continued)

OTHER PUBLICATIONS

International Search Report PCT/JP2014/053022 dated Apr. 22, 2014.

(Continued)

*Primary Examiner* — Chi H Pham
*Assistant Examiner* — Raul Rivas
(74) *Attorney, Agent, or Firm* — Young & Thompson

(57) ABSTRACT

A network system (500) includes a node (100). The node (100) includes a path table storage unit (114) that stores path table information for specifying connection destinations thereof and limiting the number of connection destinations, and a path table operation unit (113) that rewrites the content of the path table information. If the node (100) enters the network, if a node to be directly connected to the node (100) entered the network, and if a node directly connected to the node (100) exited the network, the path table operation unit (113) updates the path table information and constructs a new path in the network system.

7 Claims, 44 Drawing Sheets

(51) Int. Cl.
*H04L 12/751* (2013.01)
*H04L 12/703* (2013.01)

(56) References Cited

FOREIGN PATENT DOCUMENTS

| | | | |
|---|---|---|---|
| JP | 2003289302 A | 10/2003 |
| JP | 3844215 | 8/2006 |
| JP | 2008-113186 | 5/2008 |
| JP | 2009-531981 | 9/2009 |
| JP | 4824914 | 9/2011 |
| JP | 4893533 | 1/2012 |

OTHER PUBLICATIONS

Chinese Office Action Application No. 201480012755.1; dated Apr. 25, 2017.

\* cited by examiner

No. of paths:0

No. of paths:1

No. of paths:2

No. of paths:1 or 2

No. of paths:3

No. of paths:4

Fig.3
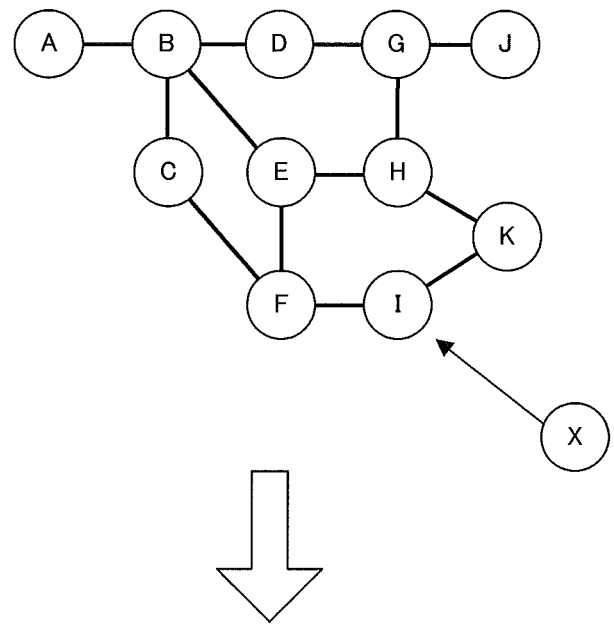
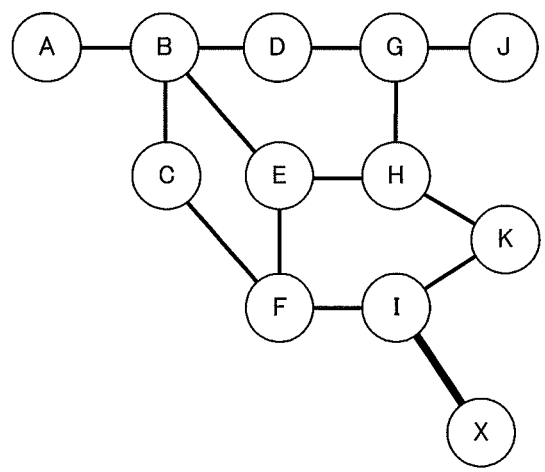

Fig.4
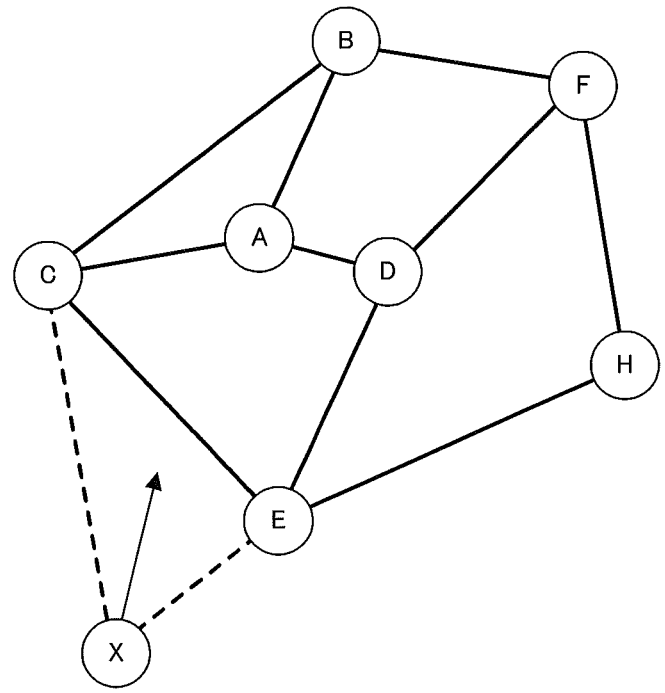
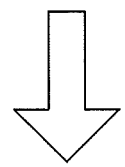
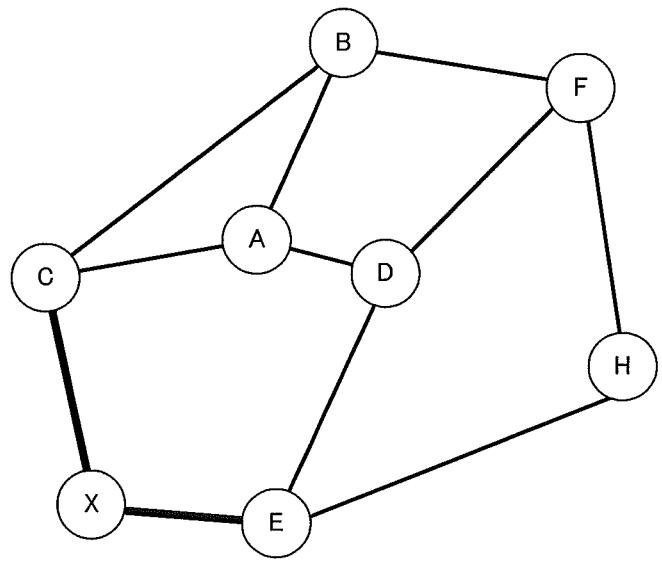

Fig.5A
Rule 1
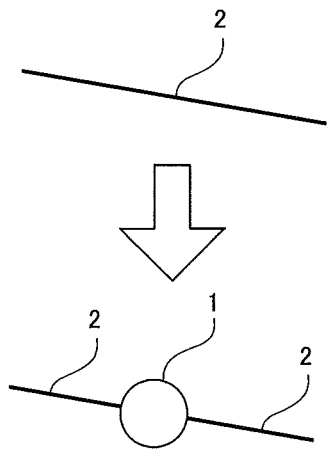
Fig.5B
Rule 2
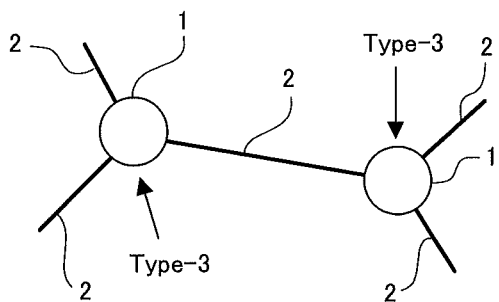
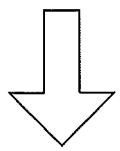
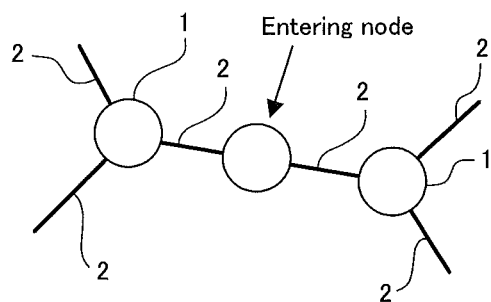

[Alphanumeric]
Indicates specific value

[?]
Indicates that some sort of value exits

[Blank]
Indicates that no value exists (Abbreviation)

| A | B | C | D |

Range managed by node A

Fig.10

| Item # | Description | Type | Transmission target node |
|---|---|---|---|
| 0 | Periodic data | Periodic | Specific node |
| 1 | Node entrance event | Event | Non-specific node |
| 2 | Candidate node event | Event | Specific node |
| 3 | Path determination event | Event | Specific node |
| 4 | Path addition event | Event | Non-specific node |
| 5 | Connection request event | Event | Specific node |

Fig.11A
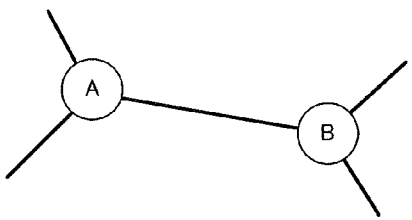
Node A path table
| A | B | ? | ? |
|---|---|---|---|
|   | A | ? | ? | A | ? | ? | A | ? | ? |
Node B path table
| B | A | ? | ? |
|---|---|---|---|
|   | B | ? | ? | B | ? | ? | B | ? | ? |
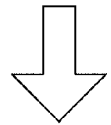
Fig.11B
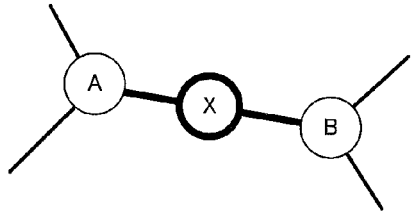
Node A path table
| A | X | ? | ? |
|---|---|---|---|
|   | A | B |   | A | ? | ? | A | ? | ? |
Node B path table
| B | X | ? | ? |
|---|---|---|---|
|   | B | A |   | B | ? | ? | B | ? | ? |
Node X path table
| X | A | B |   |
|---|---|---|---|
|   | X | ? | ? | X | ? | ? |   |   |   |

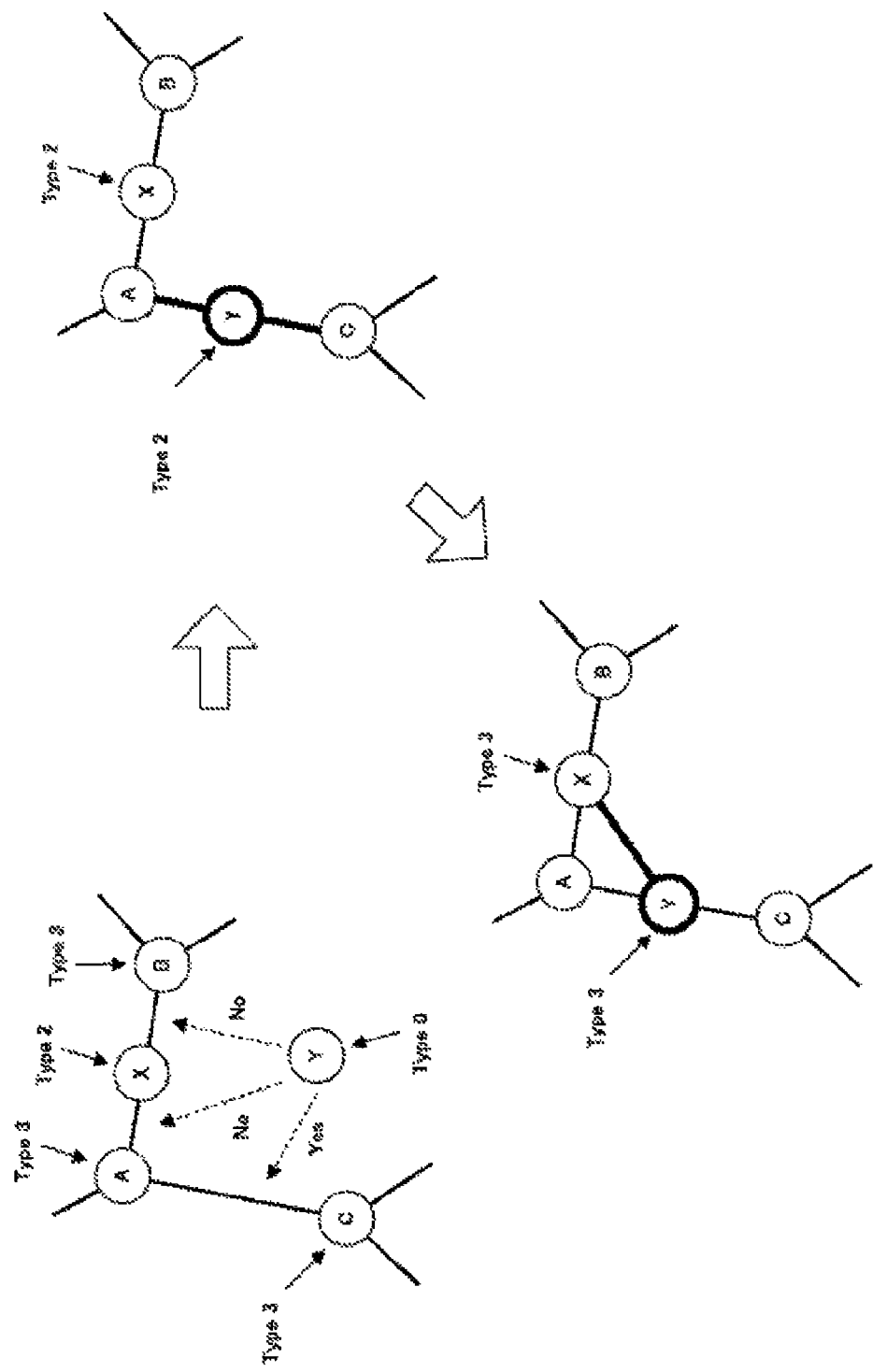

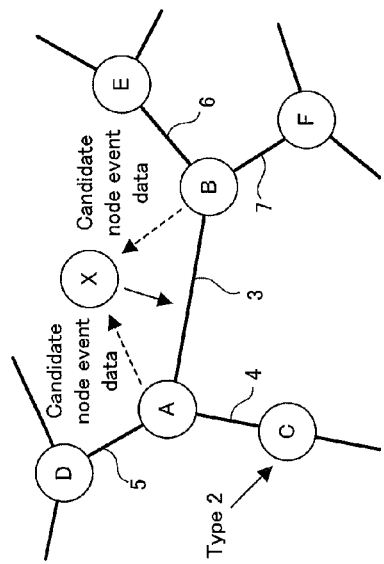
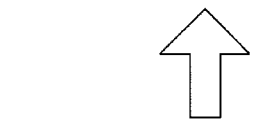
Fig.16A
Fig.16B

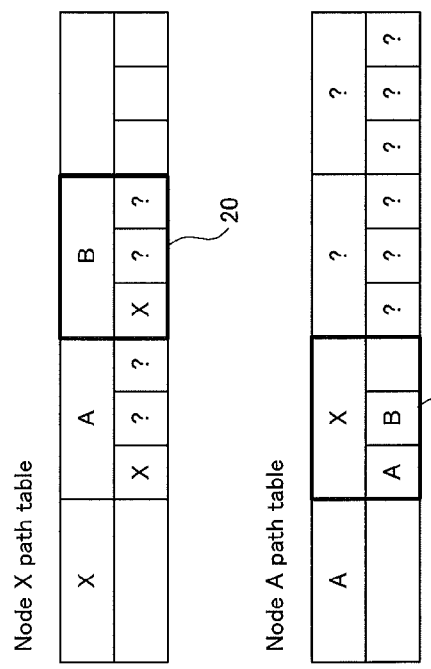
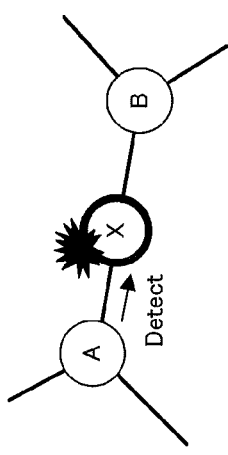
Fig.22A
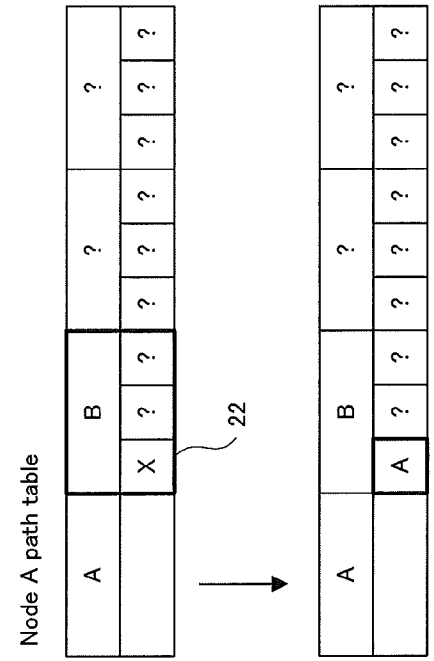
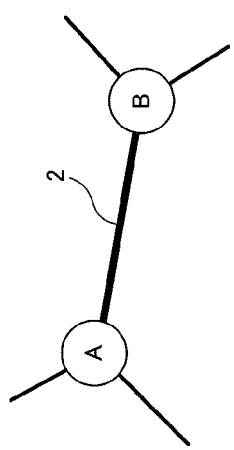
Fig.22B

Fig.23A
Fig.23B
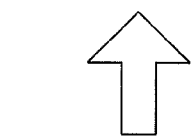
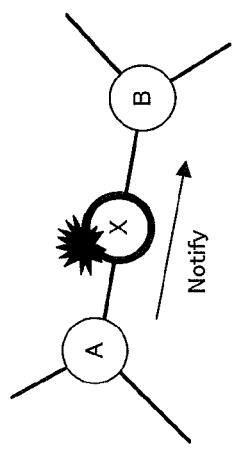

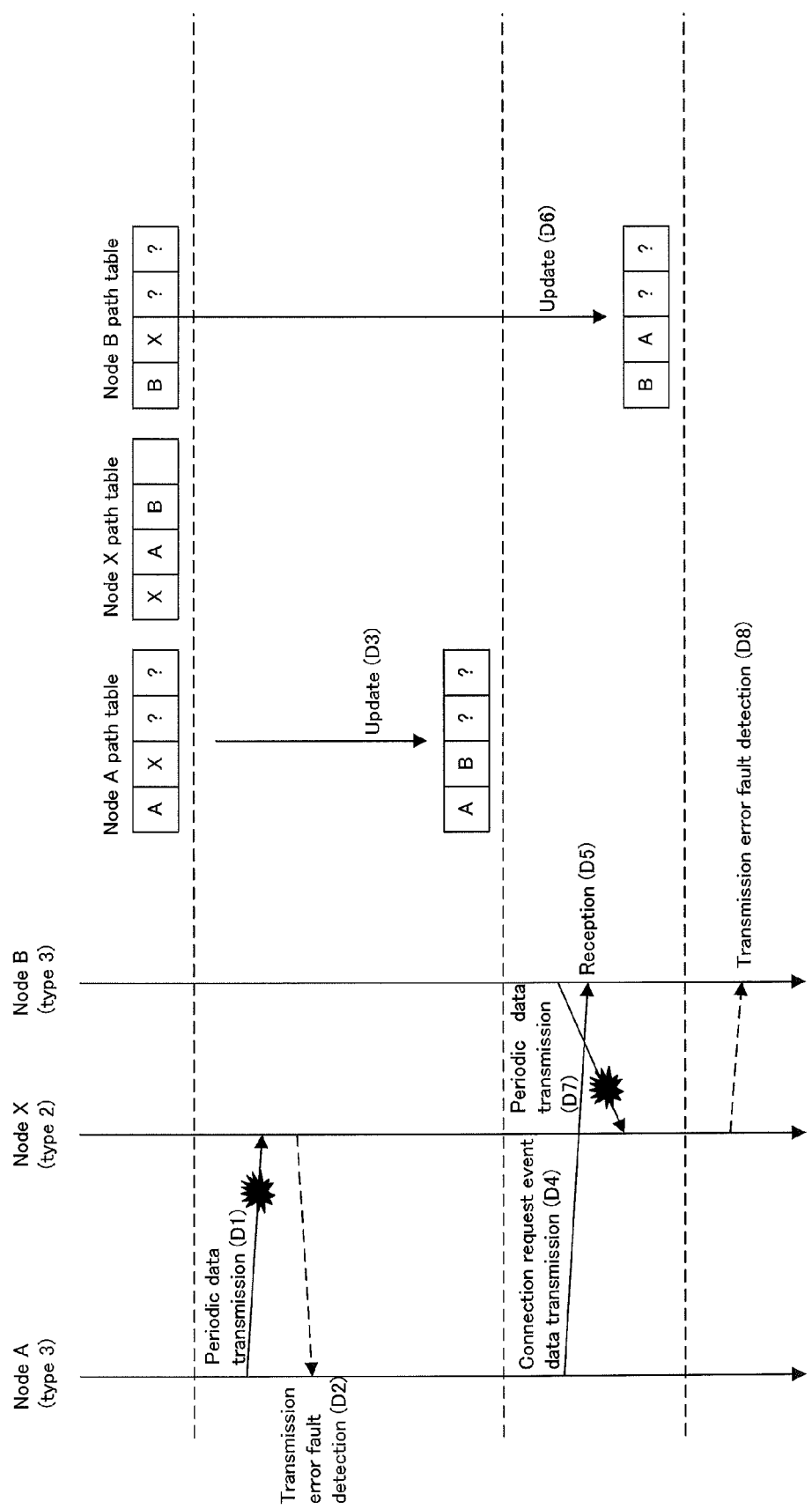

Fig.31B
Fig.31A
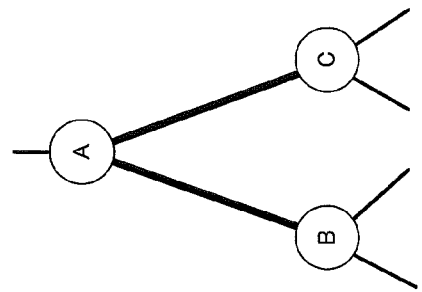
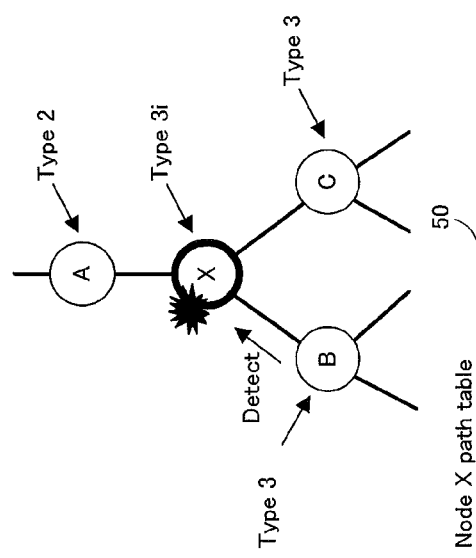

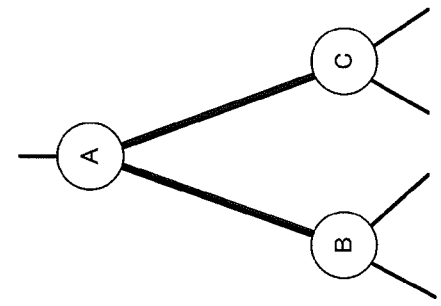
Fig.33B
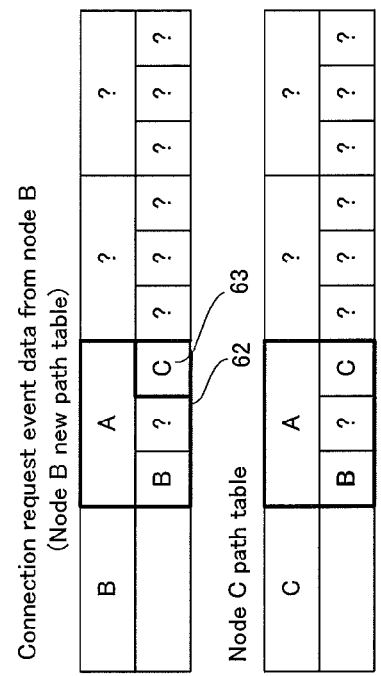
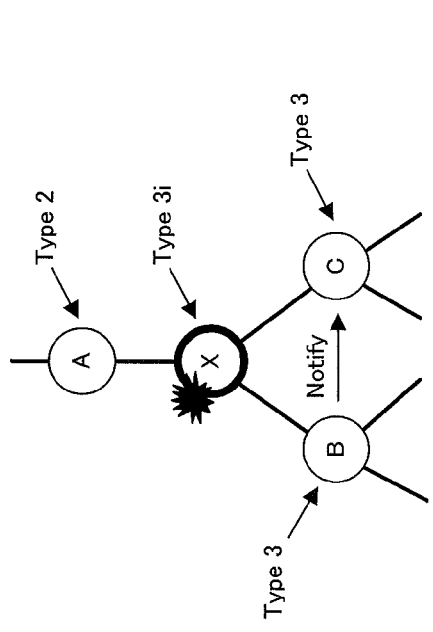
Fig.33A

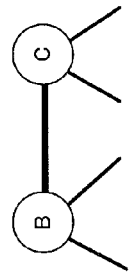
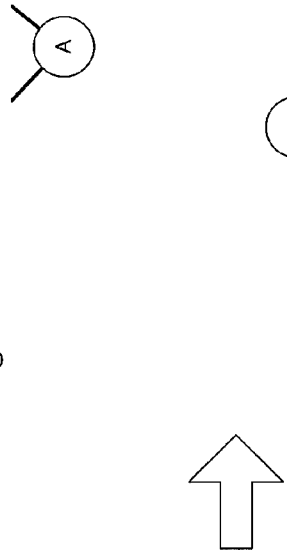
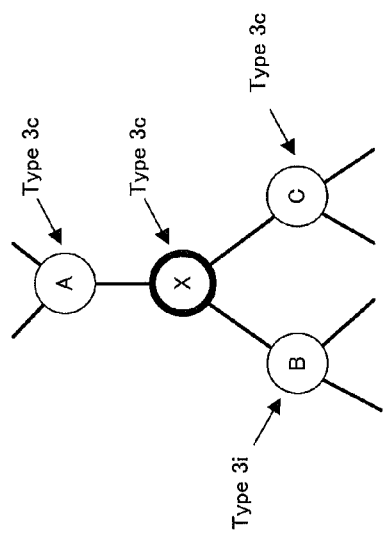
Fig.36A
Fig.36B

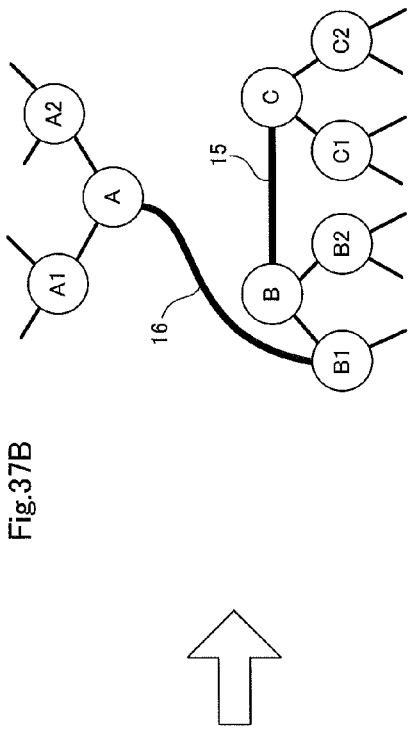
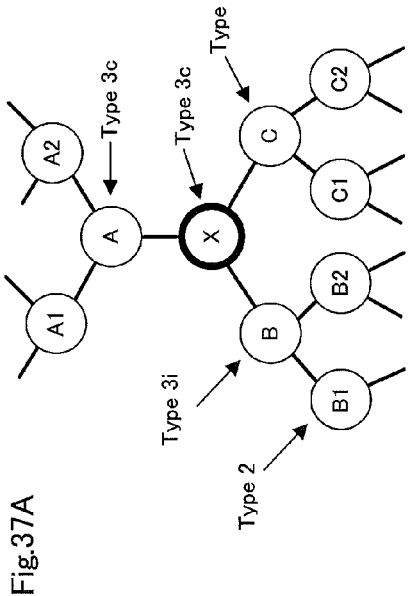
Fig.37A
Fig.37B

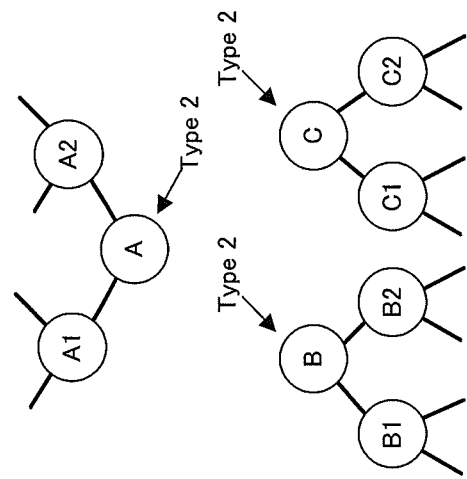
Fig.38B
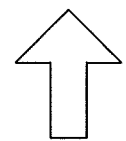
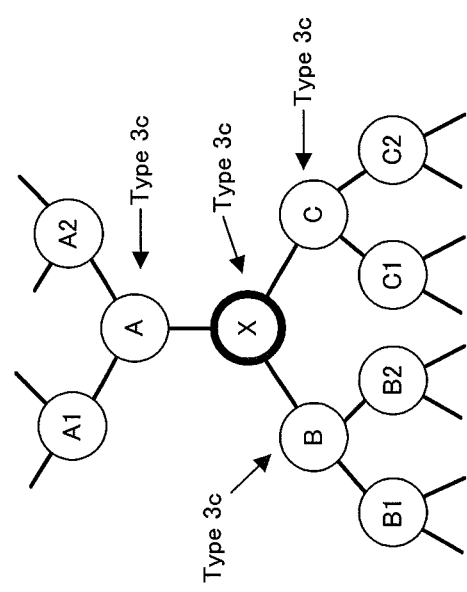
Fig.38A

Fig.40B
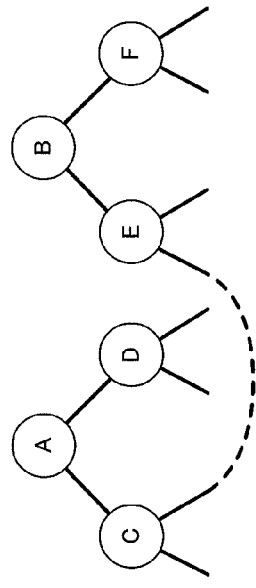
Fig.40A
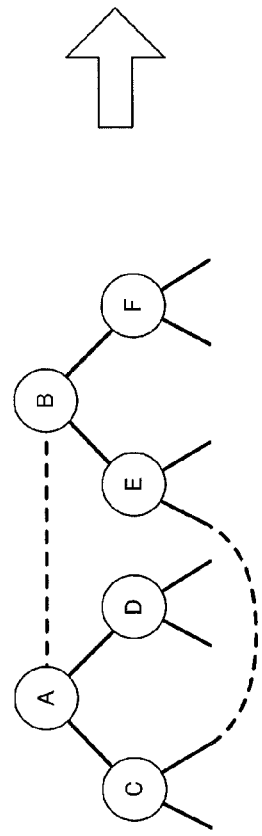
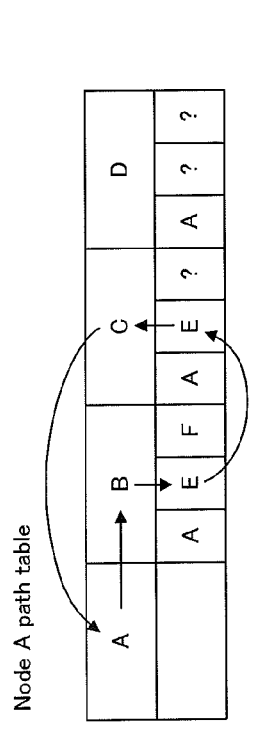

Fig.41B
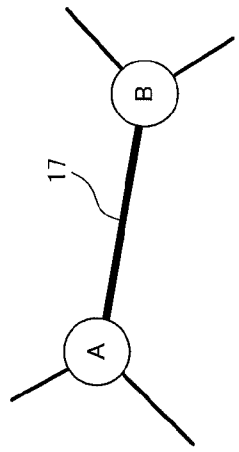
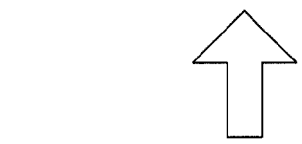
Fig.41A
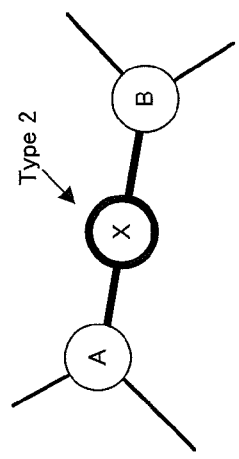

NETWORK SYSTEM, NODE, NETWORK MANAGEMENT METHOD, AND COMPUTER-READABLE RECORDING MEDIUM

TECHNICAL FIELD

The present invention relates to a network system that includes many nodes, a node used therein, a network management method, and a computer-readable recording medium having recorded thereon a program for realizing the same.

BACKGROUND ART

Distributed computing, in which many nodes (computers) are caused to perform parallel processing, has been used in recent years. With distributed computing, even if the processing ability of each node is not high, complex processing such as code breaking, medical research, and meteorological analysis can be performed since processing is performed in a distributed manner.

Incidentally, since a network is constructed by many nodes in such distributed computing, there are cases where nodes enter and exit the network. The configuration of the network changes when a node enters or exits, and therefore in this case it is necessary to construct new communication paths, for example, in order to avoid division of the network.

For this reason, techniques have been proposed in which if a node has entered or exited the network, nodes targeted for neither entering nor exiting autonomously construct new communication paths themselves (e.g., see Patent Documents 1 to 3).

Specifically, Patent Documents 1 and 2 disclose systems in which each node is caused to create, in advance, communication paths for the case of an exit, based on the connection information of adjacent nodes. In the systems disclosed in Patent Documents 1 and 2, when a node exits, it notifies the communication paths it created in advance to adjacent nodes, and therefore new communication paths are quickly constructed by the remaining nodes after the exit. For this reason, division of the network is suppressed.

Also, Patent Document 3 discloses a system in which if a fault has occurred in a node in the network, the faulty node is detected by other nodes. In the system disclosed in Patent Document 3, a node connected to the faulty node calculates metric values to adjacent nodes and selects the node with the lowest calculated metric value as the new connection destination. For this reason, even if a fault has occurred, division of the network is suppressed.

LIST OF PRIOR ART DOCUMENTS

Patent Document

Patent Document 1: JP 3844215B
Patent Document 2: JP 4893533B
Patent Document 3: JP 4824914B

DISCLOSURE OF THE INVENTION

Problems to be Solved by the Invention

Incidentally, with the systems disclosed in Patent Documents 1 and 2, if a fault has occurred in a node, communication paths for after the exit are not notified, and therefore constructing new communication paths is difficult, but with the system disclosed in Patent Document 3, a countermeasure can be taken even if a fault has occurred in a node. Accordingly, if the system disclosed in Patent Document 3 is combined with the systems disclosed in Patent Documents 1 and 2, it is thought to be possible to construct new communication paths in both the case where a node has exited and the case where a fault has occurred in a node.

However, with the systems disclosed in Patent Documents 1 and 2, there is no limit on the number of adjacent nodes, and the amount of connection information that is to be held by each node increases as the number of adjacent nodes increases, and therefore there are cases where constructing a new communication path takes too long. Also, with the system disclosed in Patent Document 3, the higher the increase in the number of adjacent nodes is, the higher the increase in the number of times metric value calculation is performed is, and therefore in this system as well, there are cases where constructing a new communication path takes too long.

Also, none of the systems disclosed in Patent Documents 1 to 3 can handle the case in which a node enters the network, and it is difficult to construct new communication paths when a node enters.

An object of the present invention is to solve the above-described problems and provide a network system, a node, a network management method, and a computer-readable recording medium according to which a new communication path can be autonomously constructed both when a node enters and when a node exits, while also suppressing an increase in the processing load in the network.

Means for Solving the Problems

In order to achieve the above object, a network system of the present invention is a system having a network that includes a plurality of nodes,
the plurality of nodes each including:
a path table storage unit that stores path table information for specifying a connection destination of said node and for limiting the number of connection destinations; and
a path table operation unit that rewrites content in the path table information,
wherein in each of the plurality of nodes, if said node enters the network, if a node to be directly connected to said node entered the network, and if a node directly connected to said node exited the network, the path table operation unit updates the path table information in said node and constructs a new path in the network system.

In order to achieve the above object, a node of the present invention is a node that constructs a network that includes a plurality of nodes,
said node including:
a path table storage unit that stores path table information for specifying a connection destination of itself and for limiting the number of connection destinations; and
a path table operation unit that rewrites content in the path table information,
wherein if said node enters the network, if a node to be directly connected to said node entered the network, and if a node directly connected to said node exited the network, the path table operation unit updates the path table information and constructs a new path in the network system.

Also, in order to achieve the above object, a network management method of the present invention is a network management method in a network system that includes a plurality of nodes, the method including:
(a) a step of, in each of the plurality of nodes, if said node enters the network, if a node to be directly connected to said node entered the network, and if a node directly connected to said node exited the network, updating path table information that specifies a connection destination of said node and limits the number of connection destinations, and constructing a new path in the network system.

Furthermore, in order to achieve the above object, a computer-readable recording medium of the present invention is a computer-readable recording medium having recorded thereon a program for causing a computer to function as a node that constructs a network that includes a plurality of nodes, the program including instructions for causing the computer to execute:

(a) a step of, if said node enters the network, if a node to be directly connected to said node entered the network, and if a node directly connected to said node exited the network, updating path table information that specifies a connection destination of said node and limits the number of connection destinations, and constructing a new path in the network system.

Advantageous Effects of the Invention

As described above, according to the present invention, a new communication path can be autonomously constructed both when a node enters and when a node exits, while also suppressing an increase in the processing load in the network.

BRIEF DESCRIPTION OF THE DRAWINGS

FIG. 3 is a diagram for describing node entering rules in a conventional network system.

FIG. 4 is a diagram for describing node entering rules in the network system of the present invention.

FIGS. 5A and 5B are diagrams each specifically showing a node entering rule in the network system of the present invention.

FIG. 10 is a diagram showing an example of types of event keys used in an embodiment of the present invention.

FIG. 11 shows an example of the entrance of a node, wherein FIG. 11A shows an inter-node configuration and node path tables before a node X enters, and FIG. 11B shows the inter-node configuration and node path tables after the node X has entered.

FIG. 12 is a diagram showing change in an inter-node configuration due to the entrance of a node Y.

FIG. 16 shows another example of the entrance of a node, wherein FIG. 16A shows an inter-node configuration and node path tables before a node X enters, and FIG. 16B shows the inter-node configuration and node path tables after the node X has entered.

FIG. 17 is a diagram showing an example of a path being added due to a periodic path addition event, wherein

FIG. 22 is a diagram showing an example of the exit of a type-2 node in the network, wherein FIG. 22A shows an inter-node configuration and node path tables before the exit of the node, and FIG. 22B shows the inter-node configuration and a node path table after the exit of the node.

FIG. 23 is a diagram showing an example of a new path being constructed after the exit of a type-2 node in the network, wherein FIG. 23A shows an inter-node configuration and a node path table before the construction of the new path, and FIG. 23B shows the inter-node configuration and node path tables after the construction of the new path.

FIG. 25 is a diagram showing a sequence and transitions in path tables in the case where a new path is constructed after the exit of a type-2 node in the network.

FIG. 26 is a diagram showing an example in which a type-3i node in the network exits, and a type-2 node detects the exit first.

FIG. 27 is a diagram illustrating the detection of the exit of the node shown in FIG. 26.

FIG. 28 is a diagram illustrating notification performed after the exit of the node shown in FIG. 26.

FIG. 31 is a diagram showing an example in which a type-3i node in the network exits, and a type-3 node detects the exit first. FIG. 31A shows an inter-node configuration and node path tables before the exit of the node, and FIG. 31B shows the inter-node configuration and a node path table after the exit of the node.

FIG. 32 is a diagram illustrating an example of notification performed after the exit of the node shown in FIG. 31.

FIG. 33 is a diagram illustrating another example of notification performed after the exit of the node shown in FIG. 31. FIG. 33A shows a state in which notification is being performed after the exit of the node, and FIG. 33B shows a state after the notification.

FIG. 36 is a diagram showing an example in which a type-3c node whose connection destinations are two type-3c nodes and one type-3i node exits the network, wherein FIG. 36A shows an inter-node configuration and node path tables before the exit of the node, and FIG. 36B shows the inter-node configuration and node path tables after the exit of the node.

FIG. 37 is a diagram showing a case where a node that was disconnected from the network due to the exit of the node shown in FIG. 36 returns to the network, wherein FIG. 37A shows a state before the exit, and FIG. 37B shows a state in which the node has returned to the network after the exit.

FIG. 38 is a diagram showing an example in which a type-3c node whose connection destinations are three type-3c nodes exits the network, wherein FIG. 38A shows an inter-node configuration before the exit of the node, and FIG. 38B shows the inter-node configuration after the exit of the node.

FIG. 39 is a diagram illustrating an example of provisional path creation processing and check processing in the case of the disconnection of the nodes shown in FIG. 38, wherein

FIG. 40 is a diagram illustrating another example of provisional path creation processing and check processing in the case of the disconnection of the nodes shown in FIG. 38. FIG. 40A is a diagram showing the provisional path creation processing, and FIG. 40B is a diagram showing the check processing.

FIG. 41 is a diagram showing an example in which a node in the network starts performing exit processing itself, wherein FIG. 41A shows an inter-node configuration and node path tables before the exit of the node, and FIG. 41B shows the inter-node configuration and node path tables after the exit of the node.

MODE FOR CARRYING OUT THE INVENTION

Overview of Invention

Figure 1A:
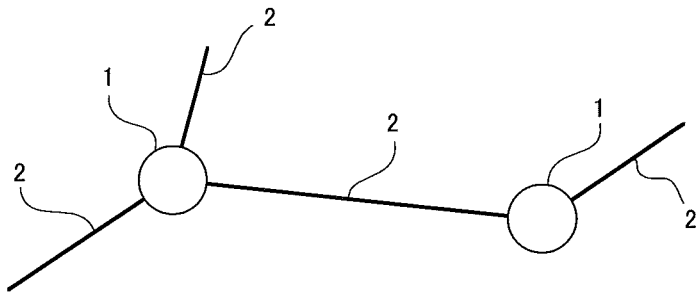
FIG. 1A is a diagram conceptually illustrating a portion of a network system according to an embodiment of the present invention.

First, the definitions of terms used in this specification and expressions in the diagrams will be described using FIGS. 1A to 1G. FIG. 1A is a diagram conceptually illustrating a portion of a network system according to an embodiment of the present invention, and FIGS. 1B to 1G are diagrams for describing different types of nodes.

As shown in FIG. 1A, a node 1 is a computing device (hardware apparatus) that is connected to a network and can execute a program, or an equivalent thereof. A path 2 is a communication path that connects nodes 1 to each other. The path 2 has a node 1 at each end, and never includes a node 1 midway. The path 2 also never branches midway.

Also, there are different types of nodes as shown in FIGS. 1B to 1G. These types are types of nodes 1 differentiated by the number of connected paths 2. The following types are included in the present embodiment.

Figure 1B:
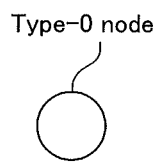
FIGS. 1B to 1G are diagrams for describing different types of nodes.
Figure 1C:
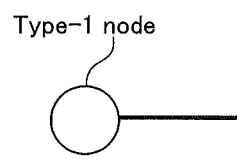
Figure 1D:
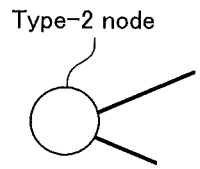
Figure 1E:
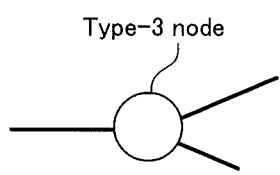

FIG. 1B shows a "type 0". The type 0 is a node that has 0 paths. FIG. 1C shows a "type 1". The type 1 is a node that has 1 path. FIG. 1D shows a "type 2". The type 2 is a node that has 2 paths. FIG. 1E shows a "type 3". The type 3 is a node that has 3 paths.

Figure 1F:
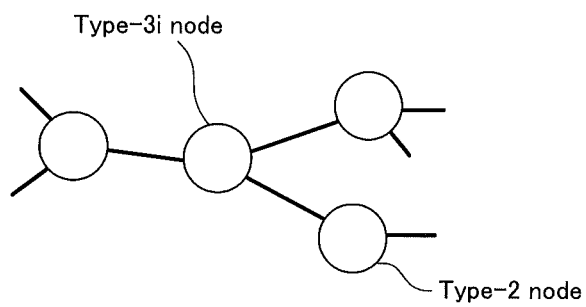
Figure 1G:
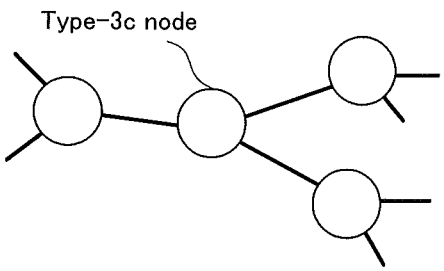

Also, the "type 3" node is further divided into two types, namely a "type 3i" and a "type 3c". FIG. 1F shows the "type 3i". The type 3i is a type in which a type-2 node is included among the three nodes connected on the respective paths. FIG. 1G shows the "type 3c". The type 3c is a type in which a type-2 node is not included among the three nodes connected on the respective paths.

Next, the number of paths of nodes will be described using FIGS. 2A to 2F. FIGS. 2A to 2F are diagrams each showing a relationship between the number of node paths and a network configuration.

In general, when the number of paths 2 connected to a node 1 increases, the management of the network becomes commensurately more complex, and the amount of data used in management also increases. In view of this, consider the case of reducing the number of paths 2 in the network.

Figure 2A:
FIGS. 2A to 2F are diagrams each showing a relationship between the number of node paths and a network configuration.

FIG. 2A shows the case where the number of paths is 0 (zero). As shown in FIG. 2A, if the number of paths is 0, the node 1 is in a state of not yet belonging to a network.

Figure 2B:
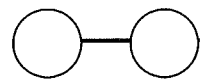

FIG. 2B shows the case where the number of paths is 1. As shown in FIG. 2B, if the number of paths is 1, a node 1 exists at each end of the path 2, and each node 1 is located at an end of the network. For this reason, if the path 2 is disconnected, the nodes 1 enter a state of being isolated from the network. Note that a state in which the number of paths is 1 for all of the nodes 1 on the network is a state that cannot exist except for the case where the number of nodes in the network is 2.

Figure 2C:
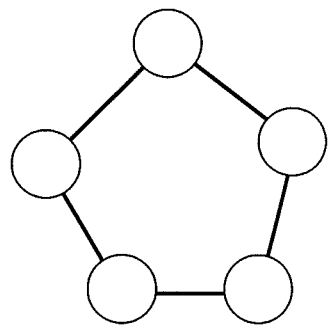

FIG. 2C shows the case where the number of paths is 2. As shown in FIG. 2C, if the number of connections is 2 for all of the nodes 1 in the network, each node 1 is part of a ring-shaped network. Also, if a node 1 for which the number of connections is 1 is included in the network, the node 1 is part of a line-shaped network as shown in FIG. 2D.

Figure 2D:

Also, if any one of the paths 2 is disconnected in the ring-shaped network shown in FIG. 2C, the network becomes the line-shaped network shown in FIG. 2D. Furthermore, if any one of the paths is disconnected in the line-shaped network shown in FIG. 2D, the network becomes divided into two.

Figure 2E:
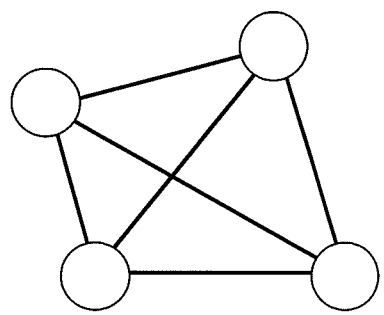

FIG. 2E shows the case where the number of paths is 3. As shown in FIG. 2E, in this case, the nodes 1 are parts of a mesh-type network. If the number of connections is 3 for all of the nodes 1 in the network, the mesh-type network is maintained even if any one of the paths 2 is disconnected.

Figure 2F:
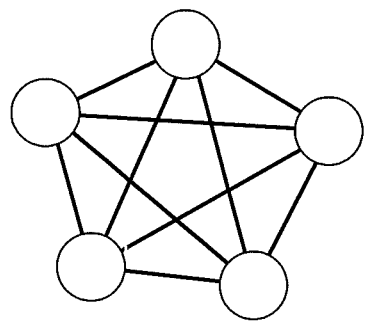

FIG. 2F shows the case where the number of paths is 4. As shown in FIG. 2F, in this case as well, the node 1 are parts of a mesh-type network similarly to the case where the number of paths is 3. Also, if the number of paths is 4, the number of paths 2 further increases compared to the case where the number of paths is 3.

As can be understood from the above description, if the number of paths is 2, there is a danger of division of the network. On the other hand, if the number of paths is 4 or more, management becomes complex due to the increase in the number of paths. For this reason, the present invention is based on the number of paths being 3 for all of the nodes, and the case where the number of paths is 2 is allowed as an exception. Also, in the following description, there are cases where the three paths of a specific node are indicated as a path (1), a path (2), and a path (3).

Next, rules for when a node enters the network will be described using FIGS. 3 to 5. FIG. 3 is a diagram for describing a node entering rule in a conventional network system. FIG. 4 is a diagram for describing node entering rules in the network system of the present invention. FIGS. 5A and 5B are diagrams each specifically showing a node entering rule in the network system of the present invention. Note that A to K and X in FIGS. 3 and 4 respectively indicate nodes.

As shown in FIG. 3, with normal P2P (peer-to-peer), if a node is to enter the network, a specific node in the P2P network is uniquely designated. For example, in general, the enterer designates a specific node IP address and inserts their node into the P2P network.

In contrast, in the present invention, the number of paths has been set to 3 for basically all of the nodes as described above, and therefore the node cannot be inserted at a specific node. For this reason, the present invention employs an idea of inserting a node as a path as shown in FIG. 4. In the present invention, there are two entering rules, which are described below, as shown in FIGS. 5A and 5B.

As shown in FIG. 5A, a rule 1 stipulates that a node 1 is required to be placed within a path 2. Also, as shown in FIG. 5B, a rule 2 stipulates that nodes 1 located at respective ends of a path 2 are required to be type-3 nodes.

Embodiments of the present invention will be described below based on the above overview.

Embodiments

A network system, a node, a network management method, and a program in embodiments of the present invention will be described below with reference to FIGS. 6 to 43.

System Configuration

Figure 6:
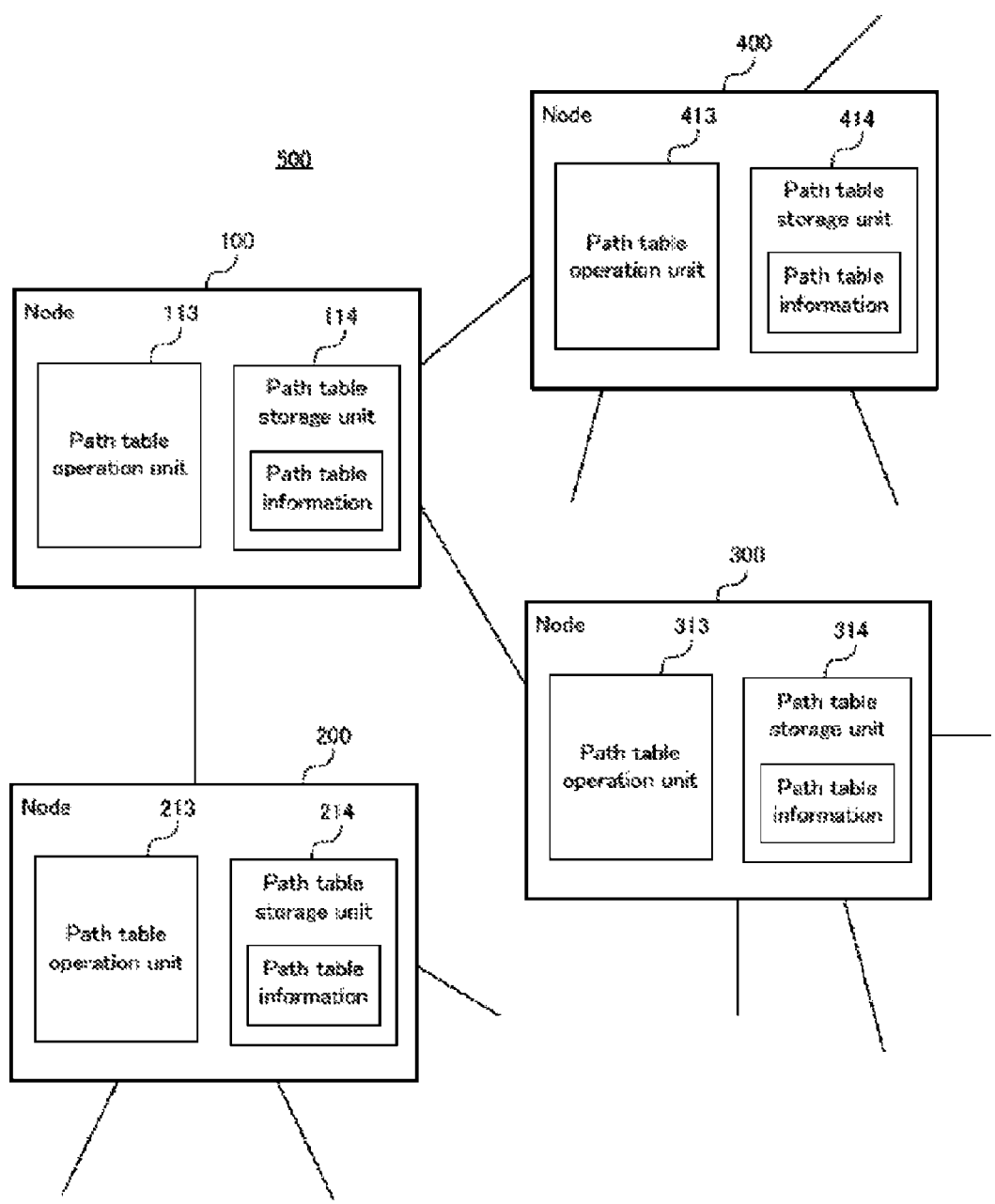
FIG. 6 is a diagram showing configurations of the network system and nodes in embodiments of the present invention.

First, the configurations of the network system and nodes in embodiments of the present invention will be described using FIG. 6. FIG. 6 is a diagram showing configurations of the network system and nodes in embodiments of the present invention.

As shown in FIG. 6, a network system 500 of the present embodiment has a network that includes multiple nodes 100 to 400. Although four nodes are shown in FIG. 6, the number of nodes in the present embodiment is not limited to this.

Also, in the present embodiment, each node has a similar configuration, and a description will be given taking the example of the node 100. As shown in FIG. 6, the node 100 includes a path table storage unit 114 that stores path table information, and a path table operation unit 113 that can rewrite the content of the path table information.

The path table information is information that specifies the connection destinations of the node 100 and also limits the number of connection destinations. Specifically, in the node 100, the path table information firstly includes an own-node path table that specifies nodes 200 to 400 that are directly connected to the node 100. The path table information also includes an other-node path table that specifies the nodes that are connected to each of the other nodes 200 to 400 that are directly connected to the node 100.

Also, the path table operation unit 113 updates the own-node path table and the other-node path table in the node 100 if the node 100 enters the network, if a node to be directly connected to the node 100 has entered the network, and if a node directly connected to the node 100 has exited the network. New paths in the network system 500 are constructed in this way.

In this way, in the present embodiment, the number of connection destination nodes is limited for each node, and in the case where an entrance to or exit from the network has occurred, new paths are constructed by merely updating the path table information. For this reason, according to the present embodiment, new communication paths can be autonomously constructed both when a node enters and when a node exits, while also suppressing an increase in the processing load in the network.

The following is a specific description of the path table information used in the present embodiment with reference to FIGS. 7 to 10.

Figure 7:
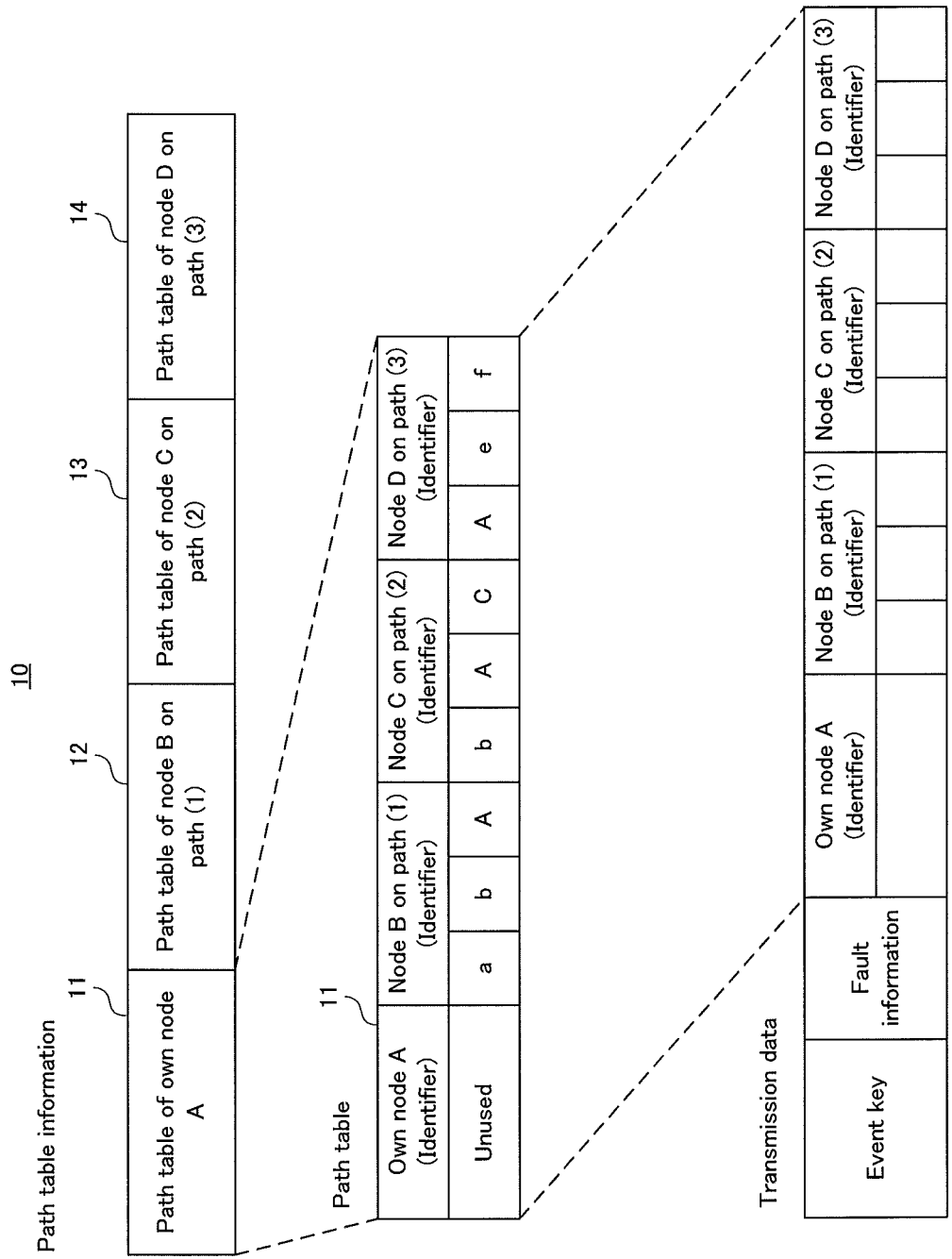
FIG. 7 is a diagram showing an example of a structure of path table information used in an embodiment of the present invention.
Figure 8:
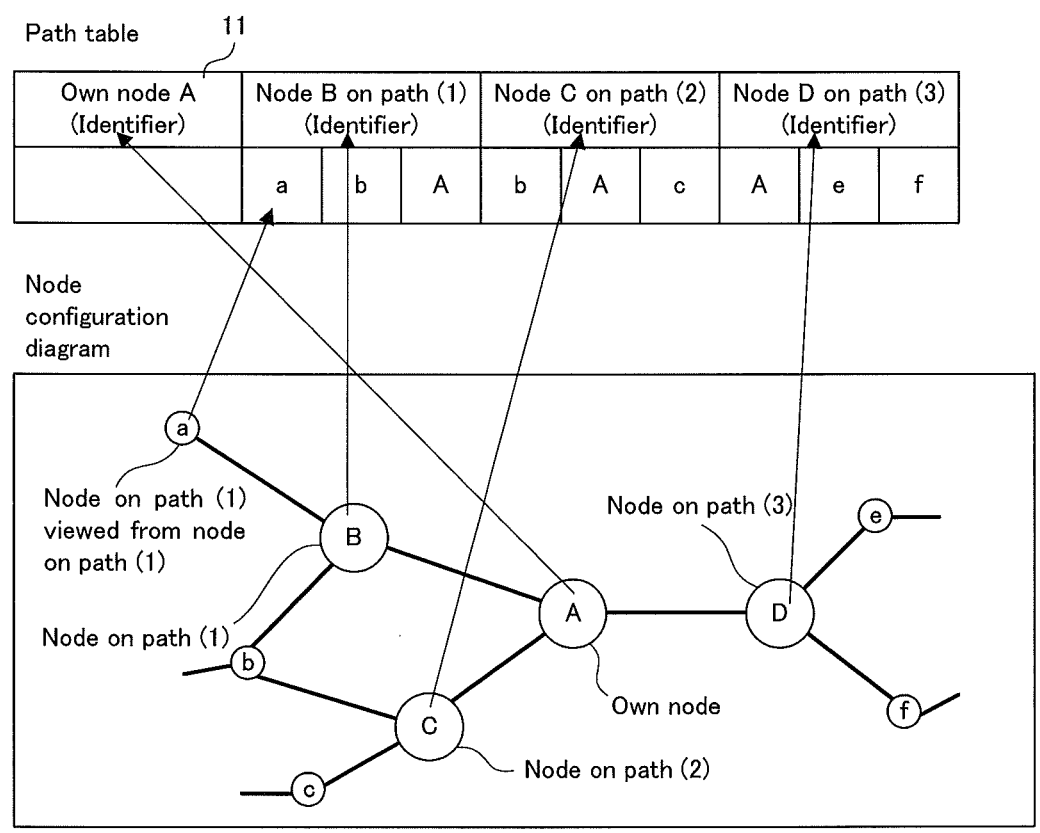
FIG. 8 is a diagram showing a relationship between information stored in a path table and an inter-node configuration.

FIG. 7 is a diagram showing an example of the structure of path table information used in an embodiment of the present invention. FIG. 8 is a diagram showing the relationship between information stored in the path table and an inter-node configuration. As shown in FIG. 7, path table information 10 includes an own-node path table 11 that specifies the nodes that are directly connected to an own node A, and other-node path tables 12 to 14 that respectively specify the nodes that are connected to the other nodes B to D that are directly connected to the own node.

Also, the middle portion of FIG. 7 and FIG. 8 show the detailed structure of the own-node path table 11. Values (identifiers) by which the own node A and the nodes B to C connected to paths (1) to (3) can be uniquely identified in the network, such as IP addresses, are registered in the own-node path table 11. Furthermore, in the example in FIGS. 7 and 8, the identifiers of the nodes that are connected to the paths (1) to (3) are also registered for the nodes B to C that are connected to the paths (1) to (3).

Specifically, in FIGS. 7 and 8, a, b, and A, which are registered in association with the node B connected to the path (1), indicate the identifiers of the nodes that are connected to the paths (1) to (3) of the node B. Similarly, b, A, and c, which are registered in association with the node C connected to the path (2), indicate the identifiers of the nodes that are connected to the paths (1) to (3) of the node C. Furthermore, A, e, and f, which are registered in association with the node D connected to the path (3), indicate the identifiers of the nodes that are connected to the paths (1) to (3) of the node D.

Also, the lower portion of FIG. 7 shows transmission data used in data transmission between nodes. The transmission data includes the information in the own-node path table, an event key, and fault information. Details of the transmission data will be described later.

As is understood from FIGS. 7 and 8, the path table information has two features. The first is that the table length is fixed because the number of paths is limited to three for each node. The second is that it is possible to manage not only the path-related information (path information) of the own node, but also the path information of the nodes on the three paths connected to the own node.

Note that the order of the paths in FIGS. 7 and 8, that is to say whether the path is the path (1), the path (2), or the path (3), has no significance. In the present embodiment, it is preferable that data is stored adjacently such that blank data does not become dispersed.

Figure 9A:
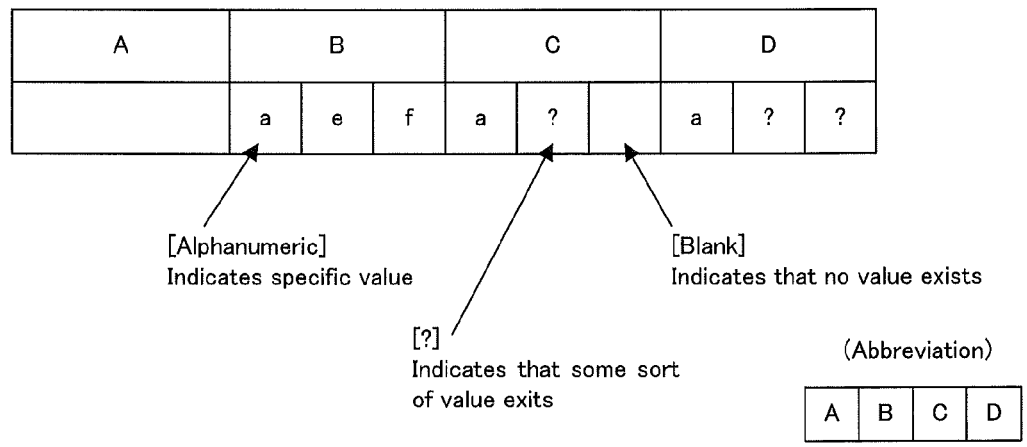
FIG. 9A is a diagram showing a general example of a path table used in an embodiment of the present invention.
Figure 9B:
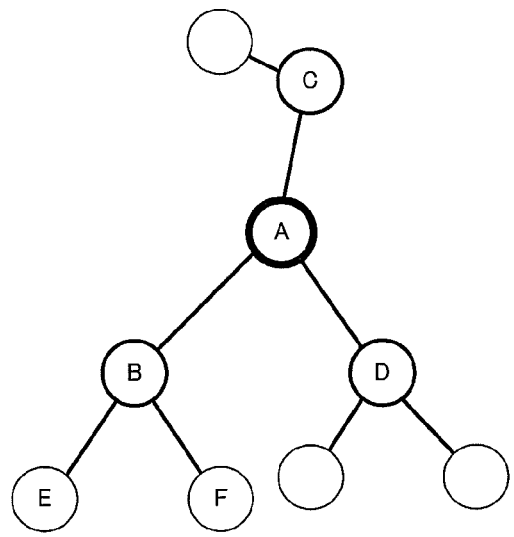
FIG. 9B is a diagram showing an inter-node configuration to which the path table shown in FIG. 9A corresponds.

FIG. 9A is a diagram showing a general example of a path table used in an embodiment of the present invention, and FIG. 9B is a diagram showing an inter-node configuration to which the path table shown in FIG. 9A corresponds.

As shown in FIG. 9B, the own node is the node A, and the path table shown in FIG. 9A shows the configuration of nodes in the range managed by the node A. Also, in FIG. 9A, [alphanumeric] indicates the value (identifier) that identifies the node, and [?] indicates that some sort of value exists. Also, a blank field indicates that no value exists.

Also, the information stored in the path table show in FIG. 9A is included in the transmission data in data transmission between nodes as shown in the lower portion of FIG. 7. For this reason, the information stored in the path table is shared between nodes. Note that as shown in FIG. 7, the transmission data includes an event key and fault information.

As shown in FIG. 10, multiple types of event keys are set. FIG. 10 is a diagram showing an example of types of event keys used in an embodiment of the present invention.

Next, updating of the path table information in the case where node entrance is performed will be described using FIGS. 11 and 12. FIG. 11 shows an example of the entrance of a node. Also, FIG. 11A shows an inter-node configuration and node path tables before a node X enters, and FIG. 11B shows the inter-node configuration and node path tables after the node X has entered.

First, assume that there is a network configured by type-3c nodes as shown in FIG. 11A. Here, if the node X is to be inserted, the node X enters at one path in the network.

In this case, in the nodes at the two ends of that path, one out of the three paths becomes a path connected to the newly-entering node X. Note that there is no change whatsoever to the other nodes in the network.

Specifically, as shown in FIG. 11B, in the path table of the node A, there is only a change from the connection destination node B to the node X, and in the path table of the node B, there is only a change from the connection destination node A to the node X. Also, the entering node X becomes a type-2 node since it is necessarily connected to two paths. The node X has entered a network configured by type-3c nodes, and at this time the nodes other than the node X all have three connected paths. Accordingly, the node X is in a state in which the number of paths cannot be increased further.

The case where a node Y further enters in the state shown in FIG. 11B will now be considered using FIG. 12. FIG. 12 is a diagram showing change in the inter-node configuration due to the entrance of the node Y.

In the case where the node Y enters in the state in FIG. 11B, the two ends of the path used for the entrance of the node Y are required to be type-3 nodes, and therefore the node Y cannot be inserted at the path of a type-2 node. Specifically, in the example in FIG. 12, the node cannot be inserted between the node A and the node X or between the node B and the node X, which are paths of the type-2 node X. Accordingly, the node will be inserted at another path.

When the node Y is inserted, one connection destination path is changed in the nodes at the two ends of the path at which the node Y was inserted, as described above, and the entering node Y becomes a type-2 node having two paths (see the middle diagram in FIG. 12).

However, since the node X that previously entered is also a type-2 node (see FIG. 11B), the node X establishes a path to the newly-entering node Y, and the nodes X and Y both become type-3 nodes. In other words, a new path is established between the newly-entering node Y and the node X that previously entered (see the lower diagram in FIG. 12).

If a node entrance is performed with the system described above, either all of the nodes in the network become type-3 nodes, or only one of the nodes is a type-2 node, and the other nodes are type-3 nodes. For this reason, the configuration of the network can be simplified.

Figure 13:
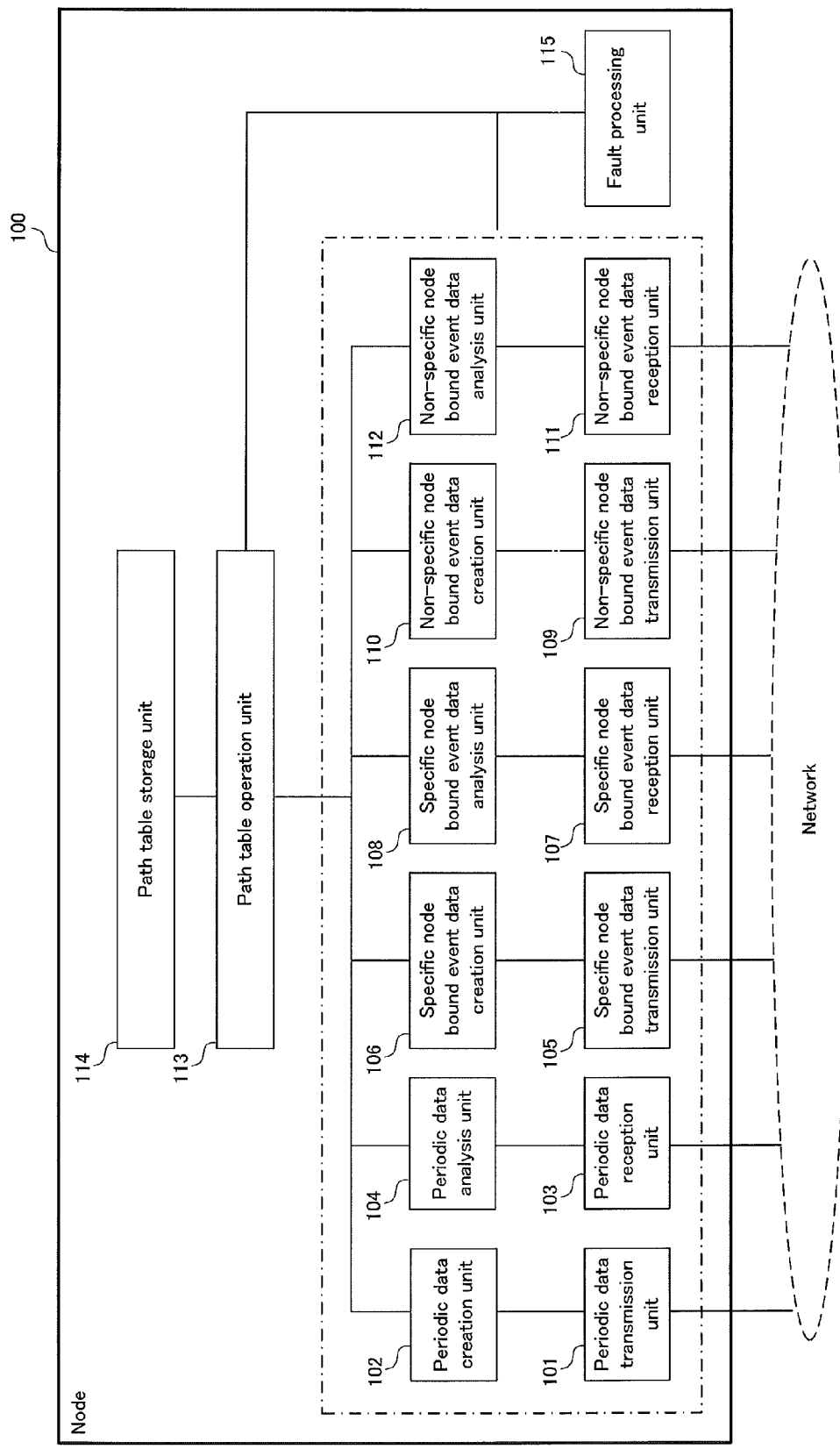
FIG. 13 is a block diagram showing a specific configuration of a node in an embodiment of the present invention.

Next, the configurations of the nodes in the present embodiment will be described in further detail using FIG. 13. FIG. 13 is a block diagram showing the specific configuration of a node in an embodiment of the present invention. FIG. 13 shows an example of only one node 100 that configures the network system 500 (see FIG. 6). It is assumed that there are many nodes having the same configuration as the node 100 in the network.

As shown in FIG. 13, the node 100 includes the following configurations in addition to the path table operation unit 113 and the path table storage unit 114 that are shown in FIG. 6. Specifically, the node 100 includes a periodic data transmission unit 101, a periodic data creation unit 102, a periodic data reception unit 103, and a periodic data analysis unit 104 in order to monitor the statuses of other nodes.

The node 100 also includes a specific node bound event data transmission unit 105, a specific node bound event data creation unit 106, a specific node bound event data reception unit 107, and a specific node bound event data analysis unit 108 in order to trigger an update of path information in a specific node.

The node 100 also includes a non-specific node bound event data transmission unit 109, a non-specific node bound event data creation unit 110, a non-specific node bound event data reception unit 111, and a non-specific node bound event data analysis unit 112 in order to trigger an update of path information without a specific node in mind during a node entrance or the like.

Also, the path table storage unit 114 stores data necessary for the autonomous construction of paths between nodes as described above, that is to say, the path table information (see FIG. 2). In the present embodiment, the path table operation unit 113 executes operations on the path table information based on pieces of event information.

The node 100 also includes a fault processing unit 115 in order to respond to an event when the occurrence of a fault in any of the configuration units has accompanied signal processing or the like. The fault processing unit 115 performs fault processing based on fault information in various units from the periodic data transmission unit 101 to the non-specific node bound event data analysis unit 112.

Next, the functions of the aforementioned units will be described. First, the periodic data creation unit 102 periodically acquires the path table information held by the path table storage unit 114 via the path table operation unit 113. The periodic data creation unit 102 also uses the periodic data transmission unit 101 to periodically transmit the acquired own-node path table to the nodes on the paths.

Also, the periodic data reception unit 103 receives path tables from other nodes. The periodic data analysis unit 104 analyzes the content of the path tables received from the other nodes.

When an update of the path table information becomes necessary, the path table operation unit 113 updates the path table information held by the path table storage unit 114. A case in which the path table information needs to be updated is a case in which some sort of change has occurred in the state of the node.

To achieve this, the periodic data analysis unit 104 determines a transmission event based on the result of the data analysis, and causes the specific node bound event data creation unit 106 or the non-specific node bound event data creation unit 110 to create event data that includes own-node path table information. The periodic data analysis unit 104 then transmits the created event data to the specific node bound event data transmission unit 105 or the non-specific node bound event data transmission unit 109.

Also, event data transmitted from another node is received by the specific node bound event data reception unit 107 or the non-specific node bound event data reception unit 111. The specific node bound event data analysis unit 108 or the non-specific node bound event data analysis unit 112 then analyzes the received event data.

If the result of the analysis is that further event data transmission is necessary, event data transmission is carried in a similar manner. Also, if updating of the path table is necessary, the path table operation unit 113 updates the path table information stored in the path table storage unit 114.

System Operations

Next, operations of the network system and the nodes in the embodiment of the present invention will be described. Also, in Embodiment 1, a network management method is carried out by causing the network system to operate. Accordingly, the following description of operations of the network system serves as a description of a network management method of the present embodiment.

System Operations: Node Entrance

Figure 14:
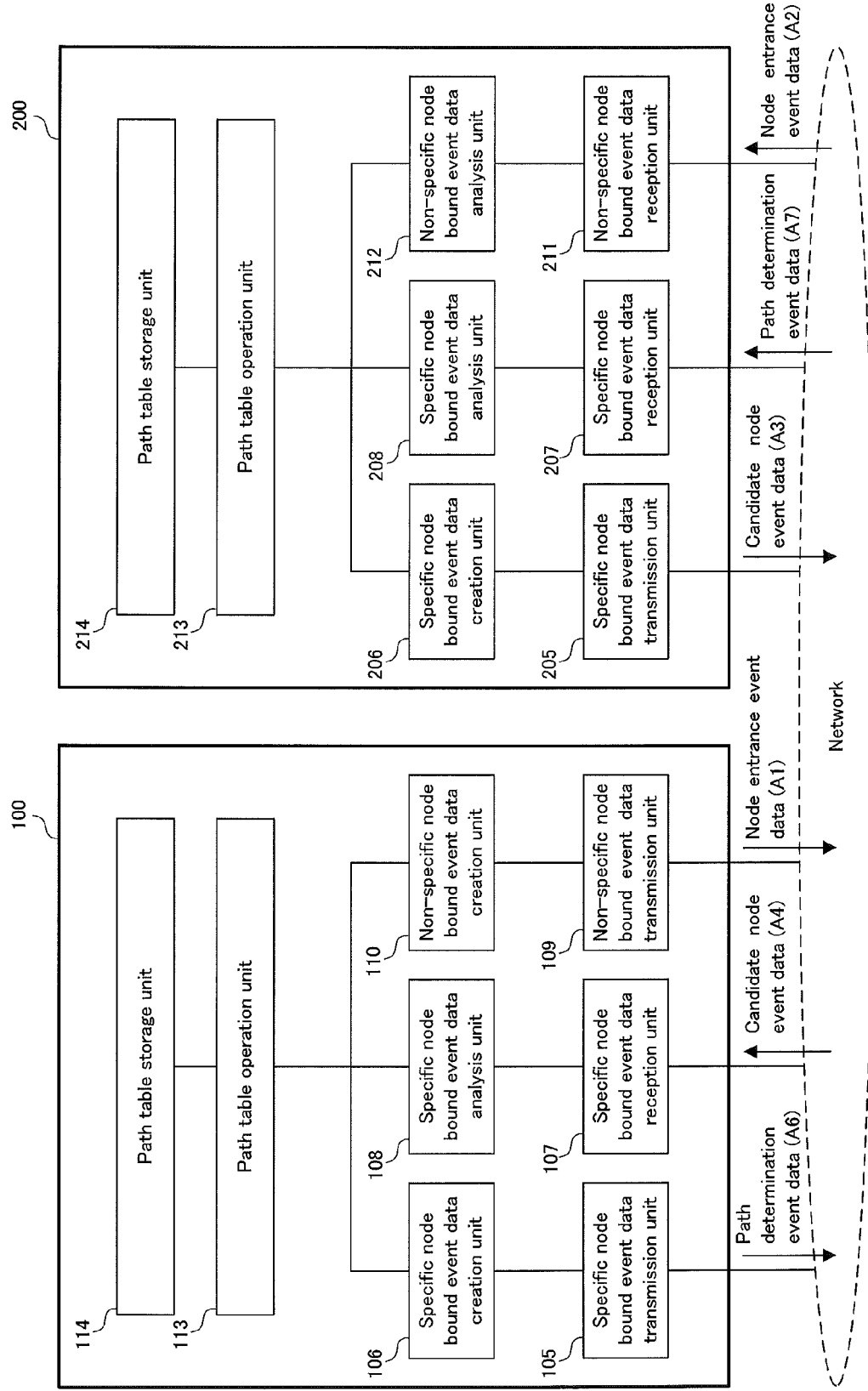
FIG. 14 is a diagram showing a flow of information in the network system in the case where a node has entered.
Figure 15:
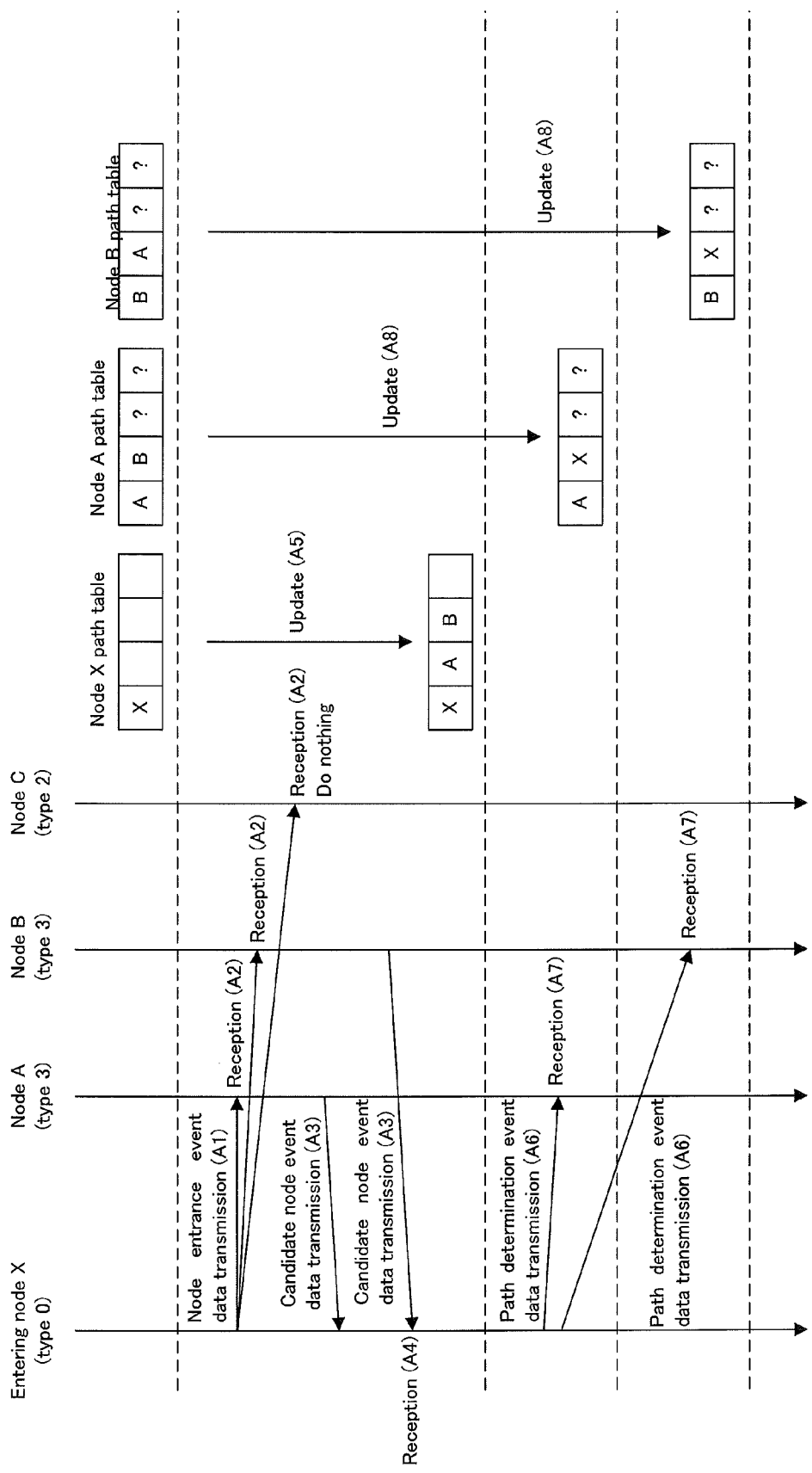
FIG. 15 is a diagram showing a sequence and transitions in path tables in the case where a node has entered.

First, operations in the case where a node has entered the network system will be described using FIGS. 14 and 15. FIG. 14 is a diagram showing the flow of information in the network system in the case where a node has entered. FIG. 15 is a diagram showing a sequence and transitions in path tables in the case where a node has entered.

Among the configurations of the node 100 shown in FIG. 13, only the configurations necessary for the description given using FIG. 15 are shown in FIG. 14. Also, only the configurations necessary for the description given using FIG. 15 are shown in the node 200 as well. Moreover, among the function blocks of the node 100 and the node 200, function blocks whose reference numbers have the same last two digits are blocks that have the same functions. Furthermore, in FIG. 15, the node 100 is indicated as the node X, and the nodes 200 are indicated as the node A, the node B, and the node C.

Firstly, assume that there are multiple nodes having a configuration similar to the node 200 (nodes A, B, and C) in the network, and that a path table storage unit 214 of each node is holding information having the same structure as the path table information shown in FIG. 7. On the other hand, assume that the node 100 that enters the network (node X) stores only own-node information in the path table information in the path table storage unit 114, and is not storing information regarding other nodes.

As shown in FIG. 15, in the above-described situation, the non-specific node bound event data creation unit 110 of the node X acquires the own-node path table (see FIG. 7) in the path table storage unit 114 via the path table operation unit 113.

Next, the non-specific node bound event data creation unit 110 uses the acquired path table to store a node entrance event key as the event key and create node entrance event data (transmission data: see FIG. 7). The non-specific node bound event data creation unit 110 transmits the node entrance event data in the network using the non-specific node bound event data transmission unit 109 (step A1).

Next, in the nodes A to C that already configure the network, a non-specific node bound event data reception unit 211 receives the node entrance event data (step A2). A non-specific node bound event data analysis unit 212 then analyzes the event key in the event data received from the non-specific node bound event data reception unit 211. If the non-specific node bound event data analysis unit 212 determines that the event is the node entrance event based on the event key in the data, the own-node path table is acquired from the path table storage unit 214 via a path table operation unit 213.

Next, the non-specific node bound event data analysis unit 212 detects the type of the own node, and in the case of not being a type-3 node (in the case of being a type-2 node), it determines that entrance is not permitted, and ends this processing without doing anything (node C).

On the other hand, in the case where the type of the own node is the type 3 (node A, B), entrance is permitted, and therefore the non-specific node bound event data analysis unit 212 transfers the own-node path table to a specific node bound event data creation unit 206. Furthermore, the non-specific node bound event data analysis unit 212 also transfers the path table of the node X, which is included in the node entrance event data that was received in step A2, to the specific node bound event data creation unit 206.

Next, the specific node bound event data creation unit 206 stores a candidate node event key in the event key, and creates candidate node event data (transmission data) based on the path table of the own node (node A, B). The specific node bound event data creation unit 206 then sets the node X, which is the transmission origin of the node entrance event data that was received in step A2, as the transmission destination node, and transmits the candidate node event data via a specific node bound event data transmission unit 205 (step A3).

Next, in the node X that is to enter the system, the specific node bound event data reception unit 107 receives the candidate node event data (step A4), and sends the received data to the specific node bound event data analysis unit 108.

In the node X, the specific node bound event data analysis unit 108 determines that the event is a candidate node event based on the event key in the received data. Also, since the specific node bound event data analysis unit 108 has received candidate node events from the two different nodes A and B, it checks whether the same path exists in the path tables of the nodes A and B. If the existence of the same path cannot be found as a result of the checking, the node X receives another candidate node event and performs the path check.

In the example in FIG. 15, the path (1) of the node A and the path (1) of the node B are the same path. Accordingly, the specific node bound event data analysis unit 108 finds the same path based on path tables from multiple nodes. The specific node bound event data analysis unit 108 then creates a path table in which the nodes A and B that are to be on the two sides of the node X are connection destinations, and updates the own-node path table in the path table storage unit 114 via the path table operation unit 113 (step A5).

Next, the specific node bound event data analysis unit 108 transfers the updated own-node path table to the specific node bound event data creation unit 106. Accordingly, the specific node bound event data creation unit 106 stores a path determination event in the event key, and creates path determination event data based on the updated path table. The specific node bound event data creation unit 106 then sets the connection destinations as the transmission destinations for the path determination event data, and transmits the path determination event data from the specific node bound event data transmission unit 105 (step A6).

In the nodes A and B, a specific node bound event data reception unit 207 receives the path determination event data (step A7). A specific node bound event data analysis unit 208 then confirms that the event is the path determination event based on the event key in the received data. Accordingly, the specific node bound event data analysis unit 208 updates the path table in the path table storage unit 214 based on the path table in the received data, via the path table operation unit 213 (step A8). According to the above steps, the portions enclosed in bold lines in the path tables in the nodes A and B are automatically determined and updated in accordance with the node entrance rules as shown in FIG. 11B.

Incidentally, in the above, when the node X determines a path by analyzing multiple pieces of candidate event data, there are cases where any of the other two connection destinations of each of the two nodes A and B that have the same path (a total of four nodes) is a type-2 node. In this case, it is sufficient that three nodes including the type-2 node are set as the connection destinations of the entering node X. Note that the total of four nodes is based on the fact that since there are three paths per node, and since one among them is the same, there are two other paths, and there are two corresponding nodes.

The following describes a specific example using FIGS. 16A and 16B. FIG. 16 shows another example of the entrance of a node. Also, FIG. 16A shows an inter-node configuration and node path tables before the node X enters, and FIG. 16B shows the inter-node configuration and node path tables after the node X has entered.

In the example in FIG. 16A, the paths 3 between the node A and the node B are the same path. Also, besides the path 3, the node A has a path 4 to the node C and a path 5 to the node D. The node B has a path 6 to the node E and a path 7 to the node F.

Assuming that the node C among these nodes is a type-2 node, the entering node X is connected to the node C in addition to the node A and the node B that are located on the two sides, as shown in FIG. 16B. In this case, the portions enclosed by bold lines in the path tables of the nodes are automatically determined and updated in accordance with the node entrance rules, as shown in FIG. 16B.

System Operations: Periodic Event Transmission

Next, operations in the case where paths were added due to a periodic path addition event in the network system will be described using FIGS. 17 to 19. FIG. 17 is a diagram showing an example in which paths are added due to a periodic path addition event. Also, FIG. 17A shows an inter-node configuration before path addition, and FIG. 17B shows the inter-node configuration after path addition.

Figure 17A:
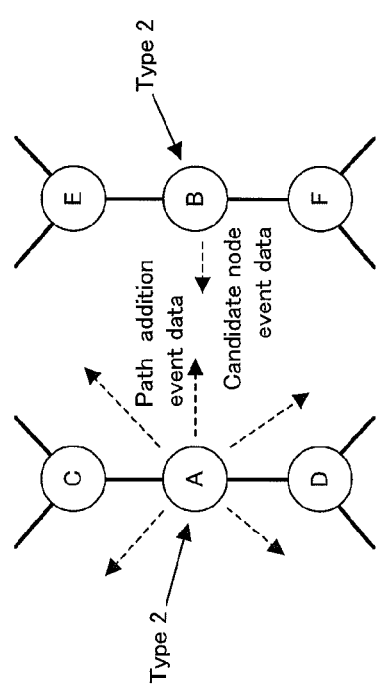
FIG. 17A shows an inter-node configuration before the addition of the path.
Figure 17B:
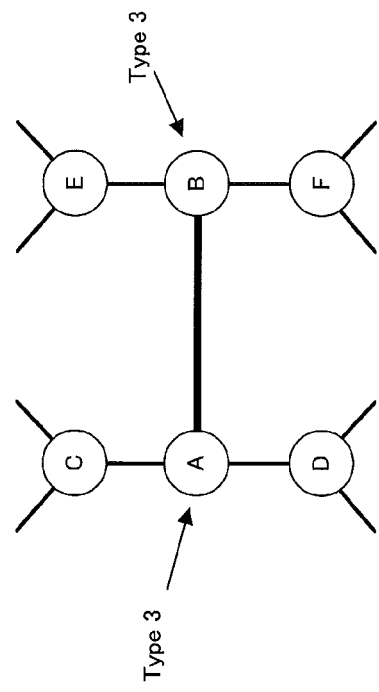
FIG. 17B shows the inter-node configuration after the addition of the path.

As shown in FIG. 17A, it is assumed that there are multiple type-2 nodes in the network. Such a case can arise due to a node entrance or exit. Also, if there are two or more type-2 nodes, the nodes can each become a type-3 node by creating a path between them.

In view of this, in the present embodiment, the type-2 node A periodically transmits a path addition event to other nodes and searches for another type-2 node, as shown in FIG. 17A. If another type node-2 is found, the node A creates a path to that node as shown in FIG. 17B.

The example in FIGS. 17A and 17B will be described below using FIGS. 18 and 19. FIG. 18 is a diagram showing the flow of information in the network system in the case of a path being added due to a periodic path addition event. FIG. 19 is a diagram showing a sequence and transitions in path tables in the case of a path being added due to a periodic path addition event.

Figure 18:
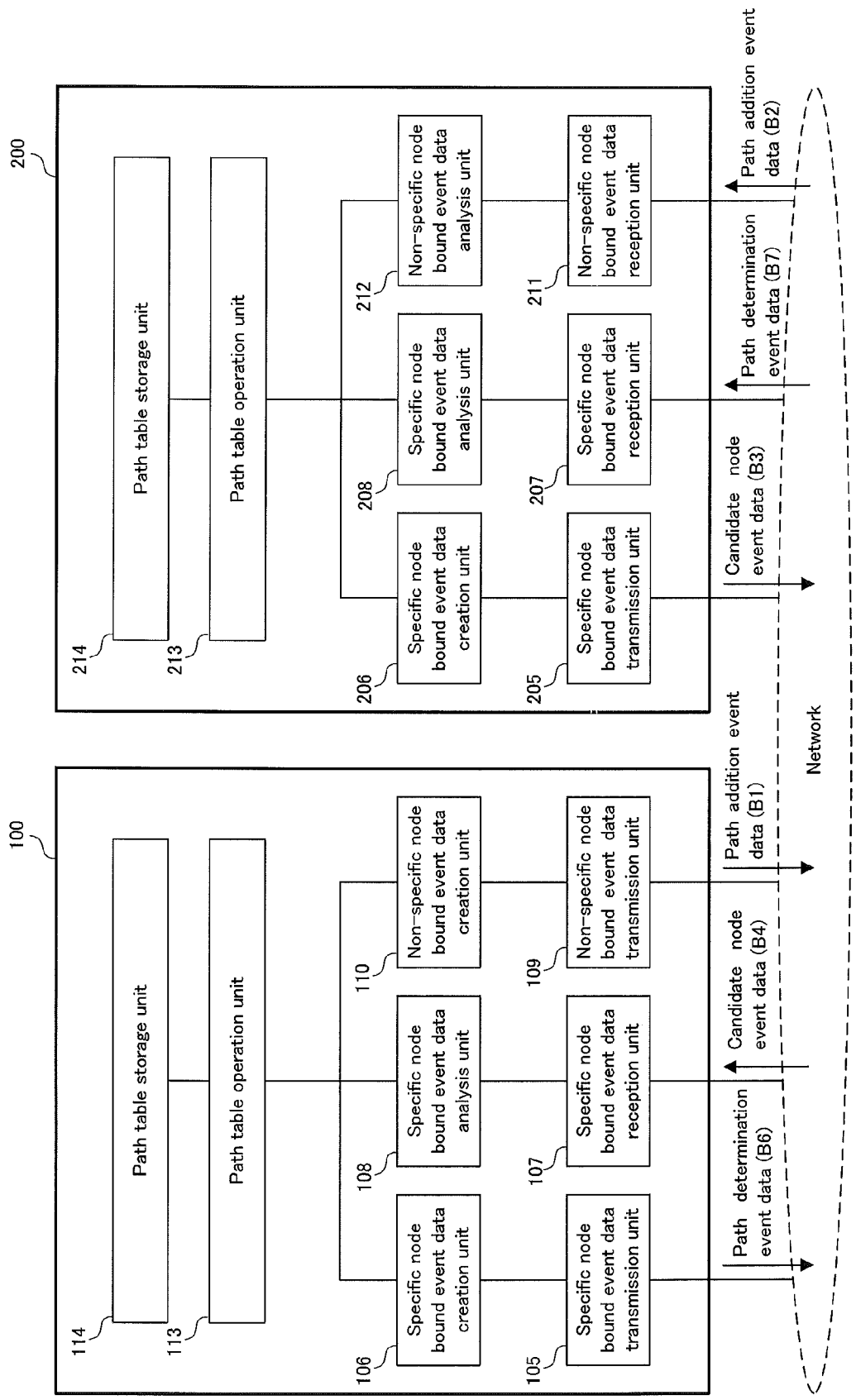
FIG. 18 is a diagram showing a flow of information in the network system in the case of a path being added due to a periodic path addition event.
Figure 19:
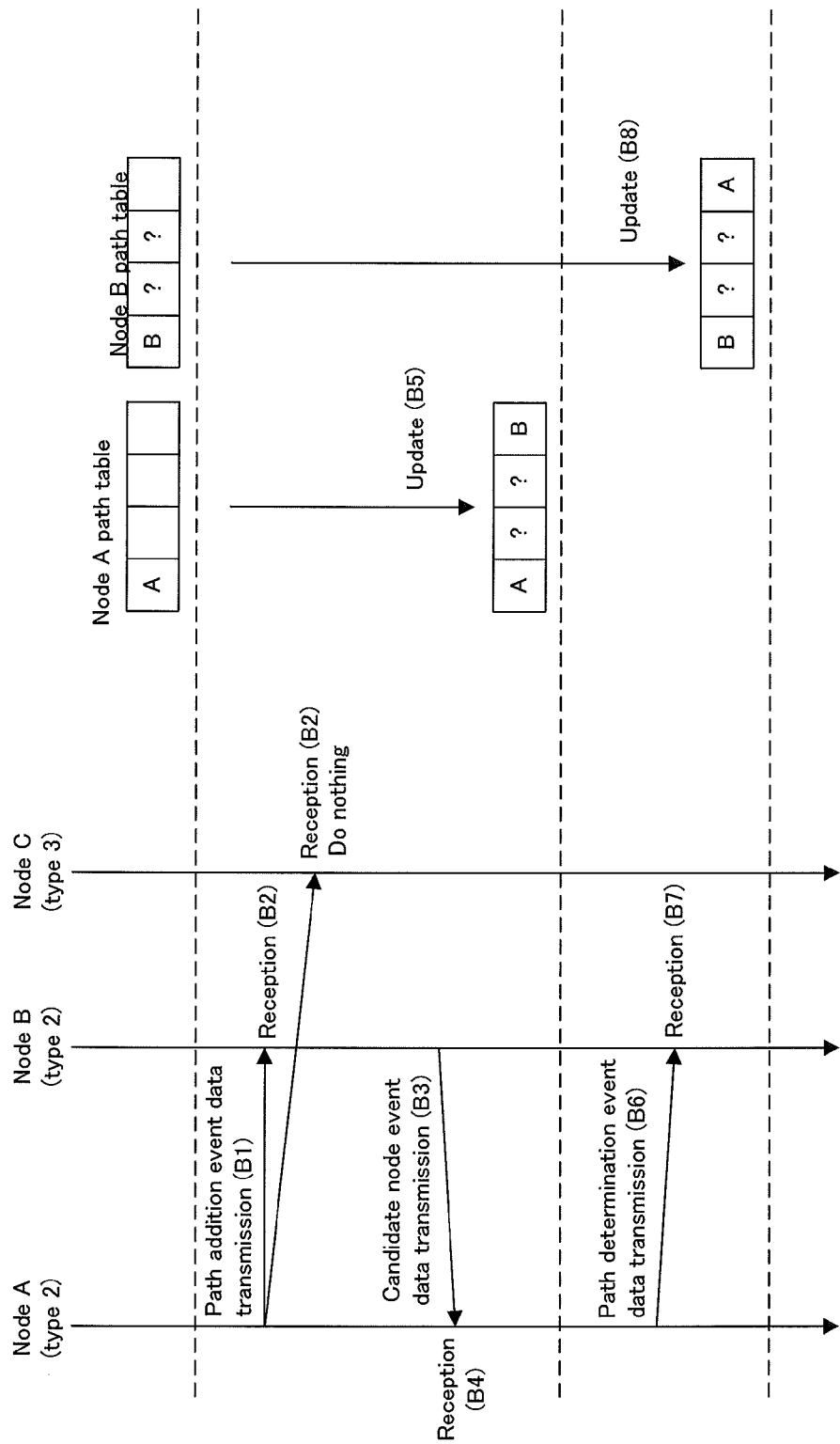
FIG. 19 is a diagram showing a sequence and transitions in path tables in the case of a path being added due to a periodic path addition event.

Among the configurations of the node 100 shown in FIG. 13, only the configurations necessary for the description given using FIG. 19 are shown in FIG. 18. Also, only the configurations necessary for the description given using FIG. 19 are shown in the node 200 as well. Moreover, among the function blocks of the node 100 and the node 200, function blocks whose reference numbers have the same last two digits are blocks that have the same functions. Furthermore, in FIG. 19, the node 100 is indicated as the node A, and the nodes 200 are indicated as the node B and the node C.

First, as shown in FIG. 19, the non-specific node bound event data creation unit 110 of the type-2 node A acquires the own-node path table (see FIG. 7) in the path table storage unit 114 via the path table operation unit 113. Next, the non-specific node bound event data creation unit 110 uses the acquired path table to store a path addition event key as the event key and create path addition event data. The non-specific node bound event data creation unit 110 then periodically transmits the created path addition event data in the network using the non-specific node bound event data transmission unit 109 (step B1).

Next, the nodes B and C in the network receive the path addition event data using the non-specific node bound event data reception unit 211 (step B2). The non-specific node bound event data analysis unit 212 then receives the data from the non-specific node bound event data reception unit 211 and analyzes it. The non-specific node bound event data analysis unit 212 determines that the event is a path addition event based on the event key in the data. Next, the non-specific node bound event data analysis unit 212 acquires the own-node path table (see FIG. 7) from the path table storage unit 214 via the path table operation unit 213.

Next, the non-specific node bound event data analysis unit 212 detects the type of the own node, and in the case of not being a type-2 node (in the case of being a type-3 node), it ends this processing without doing anything (node C).

On the other hand, in the case where the type of the own node is the type 2 (node B), the non-specific node bound event data analysis unit 212 transfers the own-node path table to the specific node bound event data creation unit 206. Furthermore, the non-specific node bound event data analysis unit 212 also transfers the path table of the node A, which is included in the path addition event data that was received in step B2, to the specific node bound event data creation unit 206.

Next, the specific node bound event data creation unit 206 stores a candidate node event key in the event key, and creates candidate node event data (transmission data) based on the path table of the own node (node B). The specific node bound event data creation unit 206 then sets the node A, which is the transmission origin of the path addition event data that was received in step B2, as the transmission destination node, and transmits the candidate node event data via the specific node bound event data transmission unit 205 (step B3).

Next, in the type-2 node A, the specific node bound event data reception unit 107 receives the candidate node event (step B4), and transfers the received data to the specific node bound event data analysis unit 108.

In the node A, the specific node bound event data analysis unit 108 determines that the event is a candidate node event based on the event key in the received data. Also, since the path table of the candidate node B has been received, the specific node bound event data analysis unit 108 confirms that the candidate node B is a type-2 node based on this path table.

In the example in FIG. 19, the candidate node B is a type-2 node, and therefore the specific node bound event data analysis unit 108 creates a path table in which the candidate node B is the connection destination, and updates the path table in the path table storage unit 114 via the path table operation unit 113 (step B5).

Next, the specific node bound event data analysis unit 108 transfers the updated path table to the specific node bound event data creation unit 106. Accordingly, the specific node bound event data creation unit 106 stores a path determination event in the event key, and creates path determination event data based on the updated path table. The specific node bound event data creation unit 106 then sets the connection destination as the transmission destination for the path determination event data, and transmits the path determination event data from the specific node bound event data transmission unit 105 (step B6).

In the node B, the specific node bound event data reception unit 207 receives the path determination event data (step B7). The specific node bound event data analysis unit 208 then confirms that the event is the path determination event based on the event key in the received data. Accordingly, the specific node bound event data analysis unit 208 updates the path table in the path table storage unit 214 based on the path table in the received data, via the path table operation unit 213 (step B8). Through the above steps, a path is newly constructed between the node A and the node B as shown in FIG. 17B.

System Operations: Node Life/Death Monitoring

Figure 20:
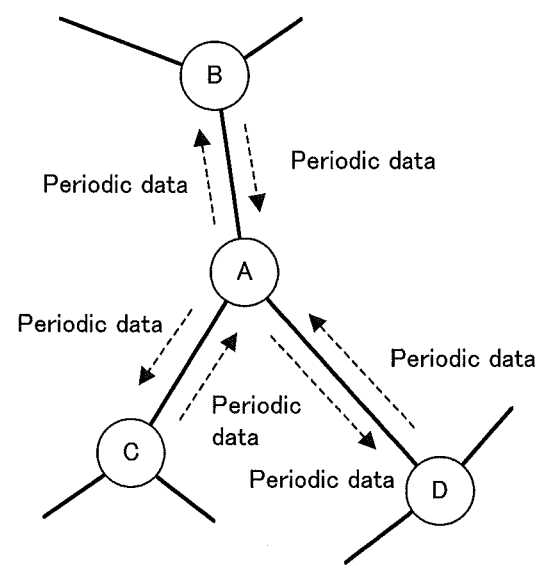
FIG. 20 is a diagram for describing node life/death monitoring in the network system.
Figure 21:
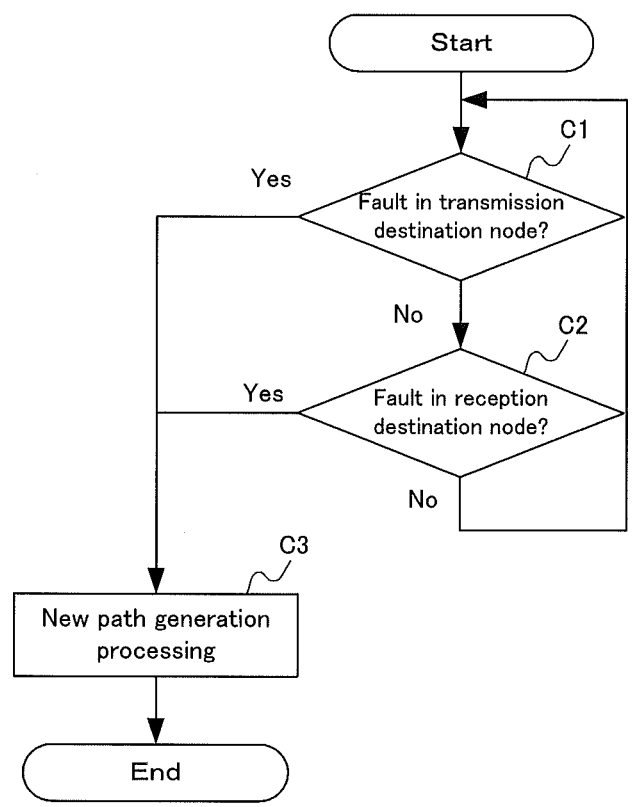
FIG. 21 is a flowchart showing node operations when executing life/death monitoring.

Next, node life/death monitoring in the network system will be described using FIGS. 20 and 21. FIG. 20 is a diagram for describing node life/death monitoring in the network system. FIG. 21 is a flowchart showing node operations when executing life/death monitoring.

As shown in FIG. 20, the node A is connected to the node B, the node C, and the node D. In this case, for example, the node A monitors the life/death of the connection destination nodes B to D by periodically transmitting data (periodic data) to these connection destination nodes over the respective paths.

Also, each node configuring the network monitors only nodes that are directly connected by a path, that is to say, only adjacent nodes. For this reason, even if the number of nodes in the network increases, the number of nodes that a node monitors is limited to three nodes at most. For this reason, the data quantity of periodic data for node monitoring that flows in the network is suppressed. Also, the transmission of periodic data by the respective nodes is performed in a non-interlocking manner.

Also, in each node, if an abnormality has occurred in the transmission of periodic data to a specific node, and if the reception of periodic data from a specific node is delayed, the node determines that an abnormality occurred in the specific node. Also, in each node, if an abnormality has occurred in a value of the path table in transmission data that includes event data and is exchanged with another node, the node determines that an abnormality has occurred in the corresponding node.

As shown in FIG. 21, in the node 100 (see FIG. 13), firstly the fault processing unit 115 determines whether or not a fault has occurred in a transmission destination node (step C1). Specifically, if a transmission abnormality has occurred in the periodic data transmission unit 101, and if a transmission abnormality has occurred in the specific node bound event data transmission unit 105, the fault processing unit 115 determines that a fault has occurred in the transmission destination node (the node to which the data is addressed).

The fault processing unit 115 executes step C2 if the result of the determination in step C1 is that a fault has not occurred in the transmission destination node, and executes step C3 if the result is that a fault has occurred in the transmission destination node.

In step C2, the fault processing unit 115 determines whether or not a fault has occurred in a reception destination node. Specifically, if the periodic data analysis unit 104 has not received a notification of received data from the periodic data reception unit 103 for a certain period of time, the fault processing unit 115 determines that a fault occurred in the reception destination node (the node that is the data sending origin).

The fault processing unit 115 re-executes step C1 if the result of the determination in step C2 is that a fault has not occurred in the reception destination node, and executes step C3 if the result is that a fault has occurred in the reception destination node.

In each node in which a fault has occurred, the fault processing unit 115 executes node exit processing. Accordingly, this node exits the network. For this reason, in step C3, processing for generating a new path is executed by the node 100 that detected the fault. Note that if a fault has occurred in one node, it is sufficient that after the exit of the node in which the fault occurred, step C3 is executed by the node that detected the fault at the earliest time among the nodes adjacent to the node in which the fault occurred.

System Operations: Node Exit (1)

Next, operations in the case of the exit of a type-2 node in the network system will be described using FIGS. 22 to 25.

In the present embodiment, there are two cases where a node exits the network. The first is a case in which a node in which a fault occurred cannot notify other nodes of its exit due to the fault, and the other nodes detect an abnormality based on a communication fault or the like and determine that the node exited. The other is a case in which the exiting node notifies other nodes in the network of its exit before exiting, and then exits.

Also, in the node management system in the present embodiment, the rules for the entrance of a node to the network are clear, and therefore there is a fixed pattern of combinations of node connections when a node exits. For this reason, the former and latter cases of a node exit are only different with respect to whether the non-exiting nodes remaining in the network create new paths, or the node planning to exit creates new paths. The following describes the former case.

In this example, the exit of a type-2 node from the network will be described with reference to FIGS. 22 and 23. FIG. 22 is a diagram showing an example of the exit of a type-2 node in the network. FIG. 22A shows an inter-node configuration and node path tables before the exit of the node, and FIG. 22B shows the inter-node configuration and node path tables after the exit of the node.

FIG. 23 is a diagram showing an example in which a new path is constructed after the type-2 node in the network has exited. FIG. 23A shows an inter-node configuration and a node path table before the construction of the new path, and FIG. 23B shows the inter-node configuration and node path tables after the construction of the new path.

As shown in FIGS. 22A and 22B, when the type-2 node X exits, a new path 2 is created between the two nodes A and B connected thereto. Also, when the node X exits, the node A and the node B on the paths detect the exit. Here, assume that the node A detected the exit before the node B.

Upon detecting the exit of the node X, the node A specifies, based on path information 21 in the path table thereof, that the node X is a type-2 node, and that the connection destination node other than the node A is the node B.

Also, the node A replaces the node X path information 21 in the path table thereof with node B path information 20 in the path table of the node X (see FIG. 22B). At this time, a value (identifier) identifying the exiting node X still remains in the node B path information 22 after the replacement in the path table of the node A. Accordingly, the node A further replaces the node X information with a value identifying the node A, which is the own node (see FIG. 22B). Accordingly, new path information is established in the path table of the node A.

Next, as shown in FIG. 23A, the node A transmits connection request event data to the node B that is the new connection destination. Upon receiving the connection request event, the node B compares the path information regarding nodes in the path table of the own node B and the own-node path information 24 in the path table included in the connection request event data. In this case, the node B determines that the node X at the connection destination has disappeared and changed to the node A.

In view of this, the node B replaces node X path information 23 (see FIG. 23A) with node A path information 25 in the own-node path table. Also, at this time, the node B writes the value in a connection request event data field 26 in a blank field 28 in the path information 25, and writes the value in a connection request event data field 27 in a blank field 29 in the path information 25.

Figure 24:
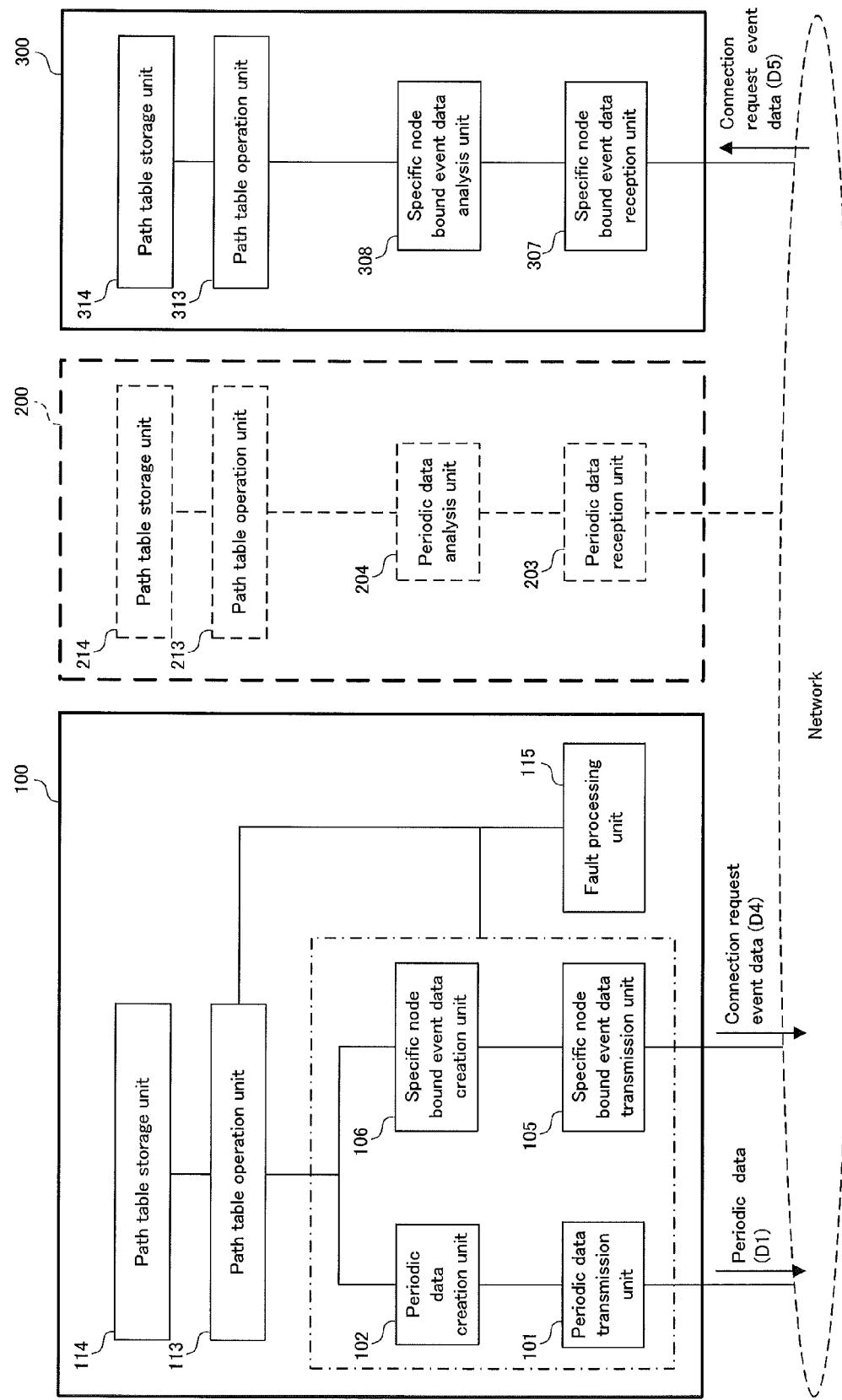
FIG. 24 is a diagram showing a flow of information in the network system in the case where a new path is constructed after the exit of a type-2 node in the network.

The following describes the examples in FIGS. 22 to 23 using FIGS. 24 and 25. FIG. 24 is a diagram showing a flow of information in the network system in the case where a new path is constructed after the exit of a type-2 node in the network. FIG. 25 is a diagram showing a sequence and transitions in path tables in the case where a new path is constructed after the exit of a type-2 node in the network.

Among the configurations of the node 100 shown in FIG. 13, only the configurations necessary for the description given using FIG. 25 are shown in FIG. 24. Also, only the configurations necessary for the description given using FIG. 25 are shown in the nodes 200 and 300 as well. Moreover, among the function blocks of the nodes 100 to 300, function blocks whose reference numbers have the same last two digits are blocks that have the same functions. Furthermore, in FIG. 25, the node 100 is indicated as the node A, the node 200 is indicated as the node X, and the node 300 is indicated as the node B.

First, in the examples in FIGS. 24 and 25, it is assumed that a path exits between the node A and the node X, and that an abnormality has occurred in the node X. As shown in FIG. 25, in the node A, the periodic data creation unit 102 creates periodic data, and the periodic data transmission unit 101 transmits the periodic data to the node X (step D1).

Since an abnormality has occurred in the node X, the periodic data transmission unit 101 detects a fault based on a transmission error (step D2), and notifies abnormality information regarding the detected abnormality to the fault processing unit 115. The fault processing unit 115 acquires the path table of the node X from the path table information in the path table storage unit 114 (see FIG. 7) via the path table operation unit 113. Also, the fault processing unit 115 specifies the node B as the new connection destination based on the content of the acquired path table.

The fault processing unit 115 then updates the path table of the node A via the path table operation unit 113 (step D3), and transfers the updated path table of the node A to the specific node bound event data creation unit 106. The specific node bound event data creation unit 106 creates connection request event data using the updated path table of the node A that was received. At this time, the specific node bound event data creation unit 106 stores the connection request event in the event key (see FIG. 7), and furthermore stores information regarding the faulty node that was detected (a value identifying the faulty node) in the fault information (see FIG. 7).

Next, the specific node bound event data creation unit 106 transmits the created connection request event data from the specific node bound event data transmission unit 105 to the node B (step D4).

Next, in the node B in the network, a specific node bound event data reception unit 307 receives the connection request event data (step D5). A specific node bound event data analysis unit 308 receives the connection request event data from the specific node bound event data reception unit 307, and analyzes it. In this example, the specific node bound event data analysis unit 308 determines that the event is a connection request event based on the event key in the data. Accordingly, the specific node bound event data analysis unit 308 updates the path table of the node B, which is stored in a path table storage unit 314, via a path table operation unit 313 (step D6).

Also, in this example, the node B transmits periodic data to the node X before the reception of the connection request event data (step D7), and can detect a fault in the node X based on a transmission error (step D8). Note that the node B has received a notification to the effect that a fault has occurred in the node X based on the fault information in the connection request event data from the node A. Accordingly, in this case, the node B does not execute any processing with respect to fault detection.

Note that unlike the example in FIG. 25, if a transmission error (step D8) has occurred in the node B before receiving the connection request event data (before step D4), path update processing is also performed by the node B similarly to the node A, but the update result is the same, and therefore there is no particular problem.

System Operations: Node Exit (2)

Next, the exit of a type-3i node in the network system will be described using FIGS. 26 to 30.

As was described using FIGS. 1F and 1G the type 3 includes the type 3i that includes a type-2 node as a connection destination node and the type 3 c that does not include a type-2 node. As mentioned above, the exit of a type-3i node will be described in this example.

Figure 26B:
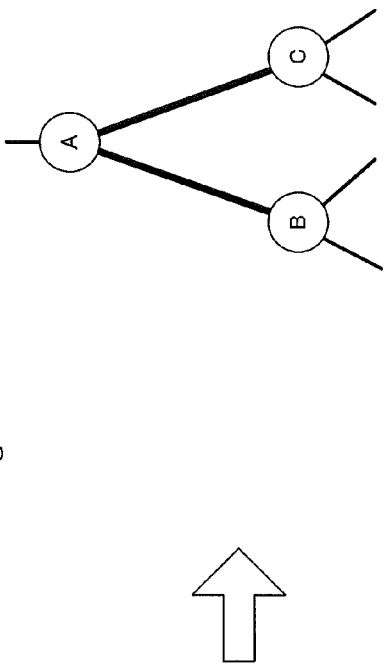
FIG. 26B shows the inter-node configuration and node path tables after the exit of the node.
Figure 26A:
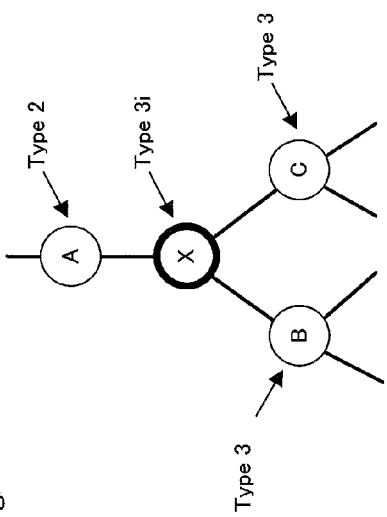
FIG. 26A shows an inter-node configuration and node path tables before the exit of the node.

FIG. 26 is a diagram showing an example in which a type-3i node in the network exits, and a type-2 node detects the exit first. FIG. 26A shows an inter-node configuration and node path tables before the exit of the node, and FIG. 26B shows the inter-node configuration and node path tables after the exit of the node.

Figure 27B:
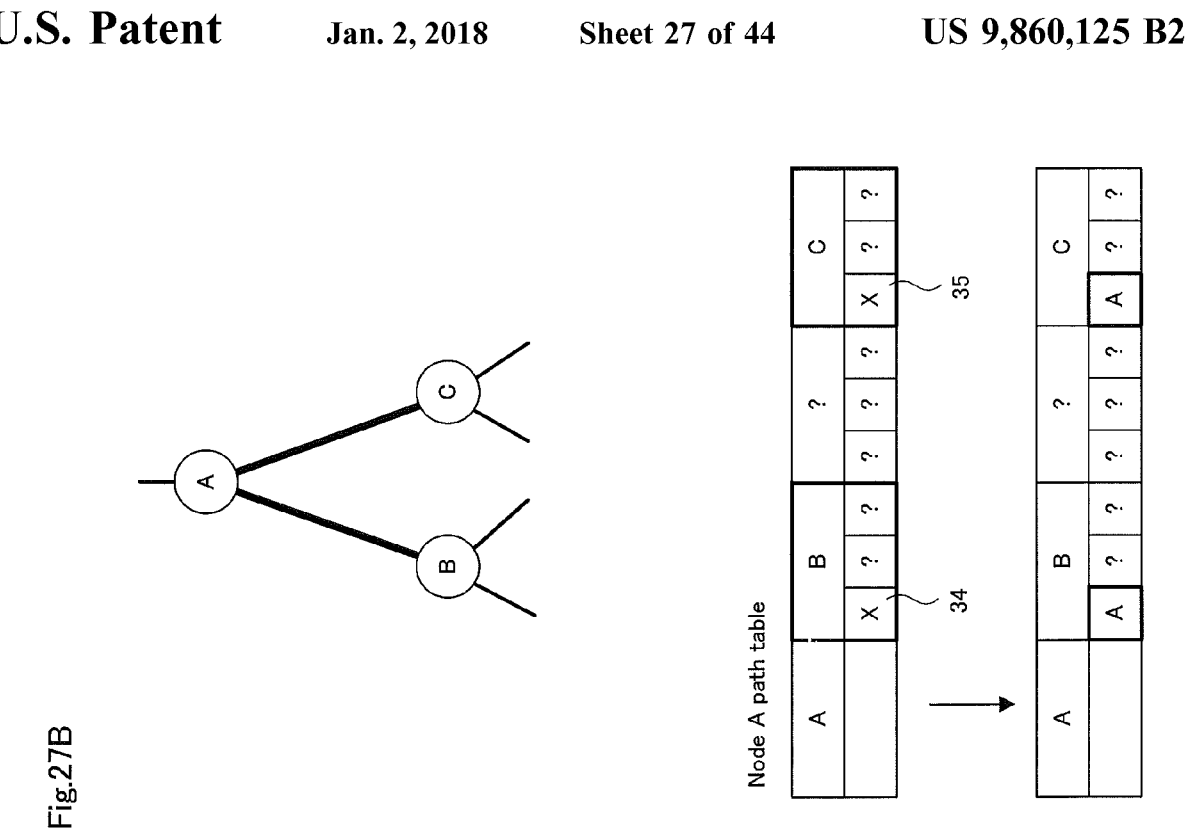
FIG. 27B shows a state after the exit of the node was detected.
Figure 27A:
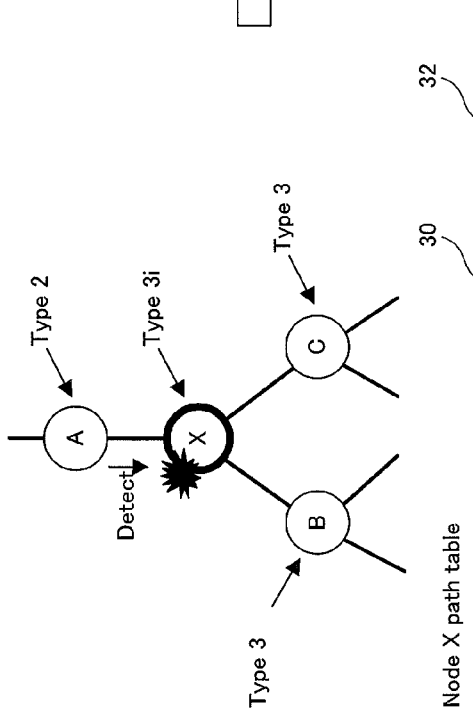
FIG. 27A shows a state in which the exit of the node was detected.

FIG. 27 is a diagram illustrating the detection of the exit of the node shown in FIG. 26. FIG. 27A shows a state in which the exit of the node was detected, and FIG. 27B shows a state after the exit of the node was detected.

Figure 28B:
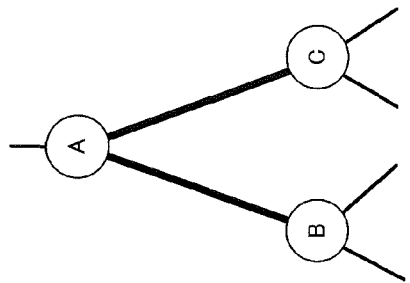
FIG. 28B shows a state after the notification.
Figure 28A:
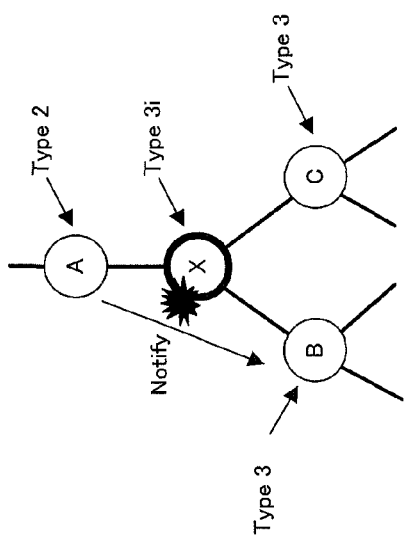
FIG. 28A shows a state in which notification is being performed after the exit of the node.

FIG. 28 is a diagram illustrating notification performed after the exit of the node shown in FIG. 26. FIG. 28A shows a state in which notification is being performed after the exit of the node, and FIG. 28B shows a state after the notification.

As shown in FIGS. 26A and 26B, when the type-3i node X exits the network, among the three nodes connected to the exiting node X, new paths are created from the type-2 node A to the type-3 nodes B and C.

Also, when the node X exits, the three nodes A, B, and C on the paths detect the exit, but these three nodes are not the same. Specifically, there is a case where the node that detected the exit is a type-2 node, and a case where it is a type-3 node, and the system is different in these cases. The case where the node that detected the exit first is the type-2 node A will be described in this example.

As shown in FIG. 27A, first, upon detecting the exit of the node X, the type-2 node A specifies that the node X is a type-3i node, and that the connection destination nodes other than the own node are the node B and the node C based on the path table of the node X in the own node A.

Next, as shown in FIG. 27B, the node A transfers node B path information 30 in the path table of the node X to the position of exiting node X path information 31 in the path table of the own node A. Furthermore, the node A transfers the node C path information 32 in the path table of the node X to a blank area 33 in the path table of the own node A.

Also, even if the above transfers are executed, information regarding the exiting node X (a value identifying the node X) remains in node B and node C path information fields 34 and 35 in the path table of the node A as shown in FIG. 27B. For this reason, the node A replaces the node X information in the fields 34 and 35 with information regarding the node A, which is the own node.

As described above, new path information is established in the path table of the node A. Accordingly, as shown in FIGS. 28A and 28B, the node A transmits connection request event data to the node B and the node C that are the connection destination on the new paths.

Next, upon receiving the connection request event data from the node A, the node B and the node C perform path change since the connection destination on a path of the own node has changed from the node X to the node A, and connection request event data has been transmitted from the node A.

For example, as shown in FIGS. 28A and 28B, upon receiving the connection request event data, the node B compares the path information regarding nodes in the path table of the own node B with own-node path information 37 in the path table in the connection request event data that was received. The node B then determines that the node X at the connection destination has disappeared, and that the node X has changed to node A.

In view of this, as shown in FIG. 28B, the node B replaces node X path information 36 with node A path information in the path table of the own node. Also, at this time, the node B writes the value in a connection request event data field 38 to a node A path information blank field 40 in FIG. 28B, and writes the value in a connection request event data field 39 to a node A path information blank field 41.

Figure 29:
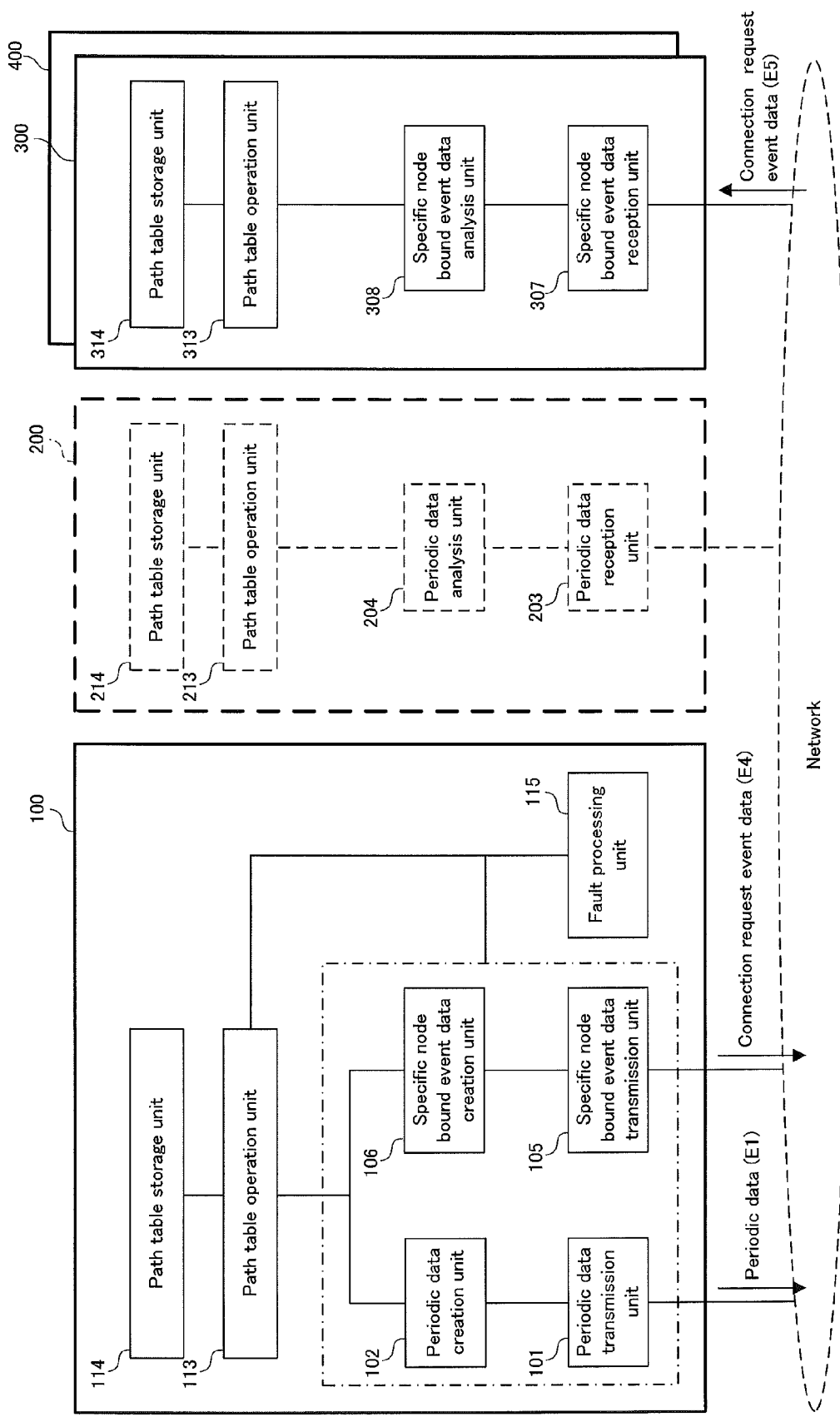
FIG. 29 is a diagram showing a flow of information in the network system in the case where a new path is constructed after the exit of a type-3i node in the network.
Figure 30:
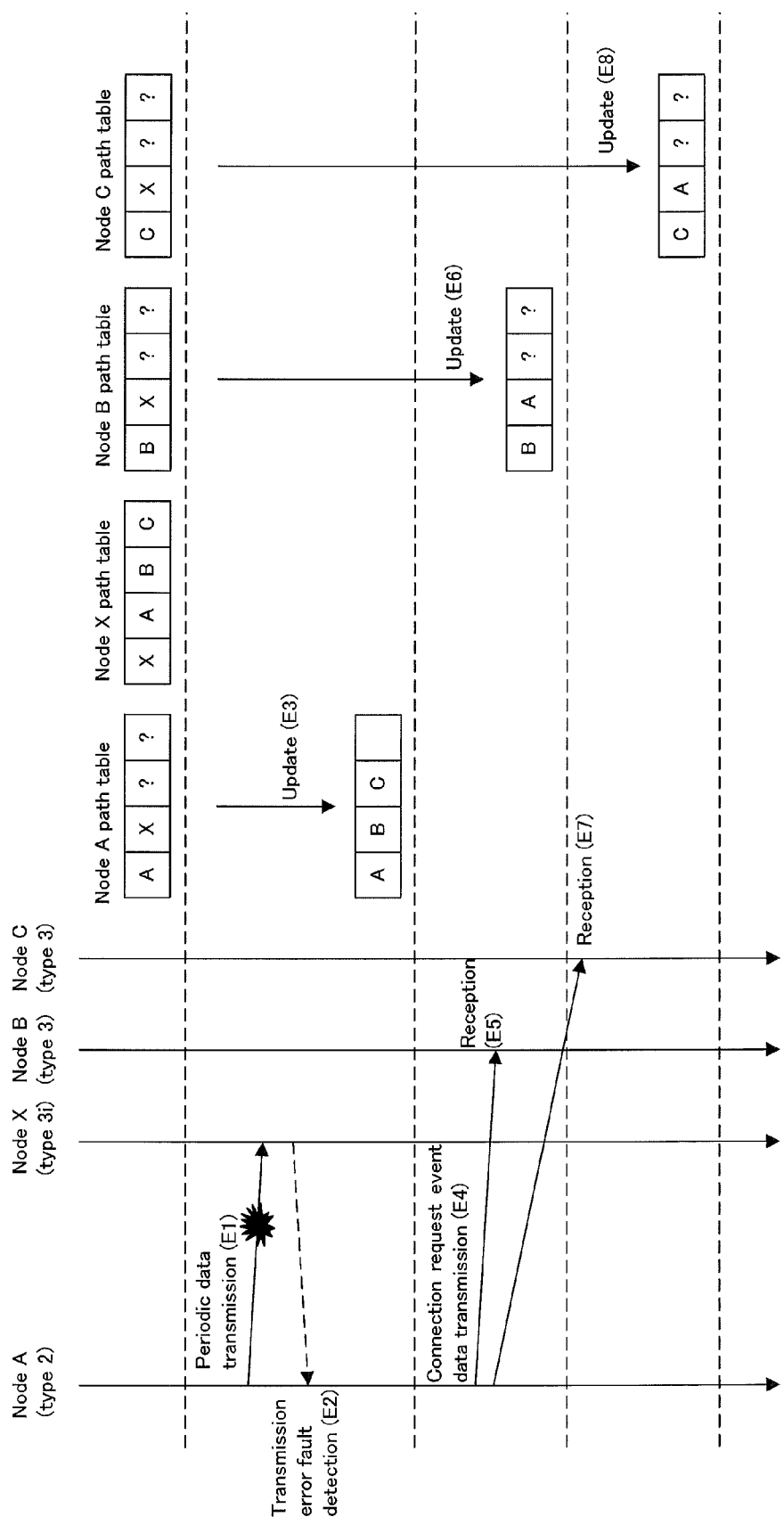
FIG. 30 is a diagram showing a sequence and transitions in path tables in the case where a new path is constructed after the exit of a type-3i node in the network.

The following describes the examples in FIGS. 26 to 28 using FIGS. 29 and 30. FIG. 29 is a diagram showing a flow of information in the network system in the case where a new path is constructed after the exit of a type-3i node in the network. FIG. 30 is a diagram showing a sequence and transitions in path tables in the case where a new path is constructed after the exit of a type-3i node in the network.

Among the configurations of the node 100 shown in FIG. 13, only the configurations necessary for the description given using FIG. 30 are shown in FIG. 29. Also, only the configurations necessary for the description given using FIG. 30 are shown in the nodes 200 to 400 as well. Moreover, among the function blocks of the nodes 100 to 400, function blocks whose reference numbers have the same last two digits are blocks that have the same functions. Furthermore, in FIG. 30, the node 100 is indicated as the node A, the node 200 is indicated as the node X, the node 300 is indicated as the node B, and the node 400 is indicated as the node C.

First, in the examples in FIGS. 29 and 30, it is assumed that a path exits between the node A and the node X, and that an abnormality has occurred in the node X. The node A is a type-2 node. The node A transmits periodic data created by the periodic data creation unit 102 from the periodic data transmission unit 101 to the node X (step E1).

Since an abnormality has occurred in the node X, the periodic data transmission unit 101 detects a fault based on a transmission error (step E2), and notifies abnormality information regarding the detected abnormality to the fault processing unit 115. The fault processing unit 115 acquires the path table of the node X from the path table information in the path table storage unit 114 (see FIG. 7) via the path table operation unit 113. Also, the fault processing unit 115 determines that the new connection destinations are the node B and the node C based on the content of the acquired path table.

The fault processing unit 115 then updates the path table of the node A (step E3), and transfers the updated path table of the node A to the specific node bound event data creation unit 106. The specific node bound event data creation unit 106 creates connection request event data using the updated path table of the node A that was received. At this time, the specific node bound event data creation unit 106 stores the connection request event in the event key (see FIG. 7), and furthermore stores information regarding the faulty node that was detected (a value identifying the faulty node) in the fault information (see FIG. 7).

Next, the specific node bound event data creation unit 106 transmits the created connection request event data from the specific node bound event data transmission unit 105 to the node B and the node C (step E4).

Next, in the node B in the network, the specific node bound event data reception unit 307 receives the connection request event data (step E5). The specific node bound event data analysis unit 308 receives the connection request event data from the specific node bound event data reception unit 307, and analyzes it. In this example, the specific node bound event data analysis unit 308 determines that the event is a connection request event based on the event key in the data. Accordingly, the specific node bound event data analysis unit 308 updates the path table of the node B, which is stored in the path table storage unit 314, via the path table operation unit 313 (step E6).

Also, in the node C as well, similarly to the node B, reception processing (step E7) and update processing (step E8) are executed, and the path table of the node C is updated. As a result, after the exit of the node X, new paths are constructed between the node A and the node B and between the node A and the node C.

System Operations: Node Exit Processing (3)

Next, another example of the exit of a type-3i node in the network system will be described using FIGS. 31 to 35. An example in which, unlike the node exit processing (2), the exit of the node X is first detected by the type-3 node B out of the three nodes A, B, and C in the network is described below.

FIG. 31 is a diagram showing an example in which a type-3i node in the network exits, and a type-3 node detects the exit first. FIG. 31A shows an inter-node configuration and node path tables before the exit of the node, and FIG. 31B shows the inter-node configuration and a node path table after the exit of the node.

Figures 32A, 32B:
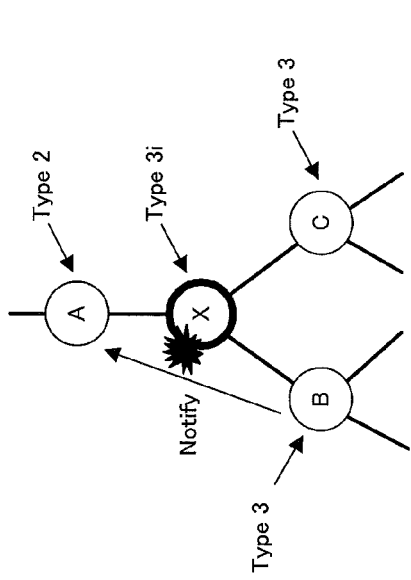
FIG. 32A shows a state in which notification is being performed after the exit of the node.
FIG. 32B shows a state after the notification.

FIG. 32 is a diagram illustrating an example of notification performed after the exit of the node shown in FIG. 31. FIG. 32A shows a state in which notification is being performed after the exit of the node, and FIG. 32B shows a state after the notification.

FIG. 33 is a diagram illustrating another example of notification performed after the exit of the node shown in FIG. 31. FIG. 33A shows a state in which notification is being performed after the exit of the node, and FIG. 33B shows a state after the notification.

As shown in FIG. 31A, first, upon detecting the exit of the node X, the type-3 node B specifies that the node X is a type-3i node, and that the connection destination nodes other than the own node are the node A and the node C based on the path table of the node X in the own node B.

Next, the node B transfers node A (type-2) path information 50 in the path table of the node X to the position of exiting node X path information 51 in the path table of the own node.

Also, even if the above transfer is executed, information regarding the exiting node X (a value identifying the node X) remains in a node A path information field 52 in the path table of the node B as shown in FIG. 31B. For this reason, the node B replaces the information regarding the exiting node X in the field 52 with information regarding the node B, which is the own node.

Furthermore, since the node A is a type-2 node, a path is available, and a node A path information field 53 is a blank field. For this reason, the node B stores information regarding the node C, which is the remaining node that had been connected to the node X, in the field 53. As described above, new path information is established in the path table of the node B.

Next, as shown in FIGS. 32A and 33A, the node B transmits connection request event data to the node A and the node C that are new connection destinations.

For example, as shown in FIGS. 32A and 32B, upon receiving the connection request event data from the node B, the node A compares the path information regarding nodes in the path table of the own node A with own-node path information 58 in the path table in the connection request event data that was received. The node A then determines that the node X at the connection destination has disappeared, and that the node X has changed to node B that is the transmission origin of the connection request event data. Furthermore, at this time, the node B also determines that the node C has been added as a connection destination.

Next, as shown in FIG. 32B, the node A replaces node X path information 56 with node B path information in the path table of the own node A. Next, the node A acquires the path information regarding the node C that is the new connection destination from node C path information 55 in the path table of the node X, and replaces blank path information 57 with the acquired information (4 in FIG. 31). At this time, exiting node X information (a value identifying the node X) remains in a field 59 in the node C path information 55. For this reason, the node A replaces the node X information in the field 59 with information regarding the node A, which is the own node.

As described above, new path information is established in the path table of the node A.

Also, as shown in FIGS. 33A and 33B, upon receiving the connection request event data from the node B, the node C compares the path information regarding nodes in the path table of the own node C with own-node path information 62 in the path table in the connection request event data that was received. Since a path does not exist between the node C and the node B, the node C determines that node C path information does not exist in the received connection request event data.

Furthermore, the node C checks whether or not information regarding the own node C exists in the received connection request event data, and specifies that the node A has a path to the node C (field 63 in path information 62).

Also, information indicating that a fault occurred in the node X is stored as fault information in the connection request event data that was transmitted from the node B. Accordingly, the node C compares node X path information 61 in the path table of the own node C with node A path information 60 in the path table of the node X. The node C then determines that the node A is a type-2 node, there has been a change from the node X to the node B in the node A path, and the node C has been added.

In view of this, the node C replaces node X path information 61 in the path table of the own node with node A path information 62 in the received connection request event data.

As described above, new path information is established in the path table of the node C.

Figure 34:
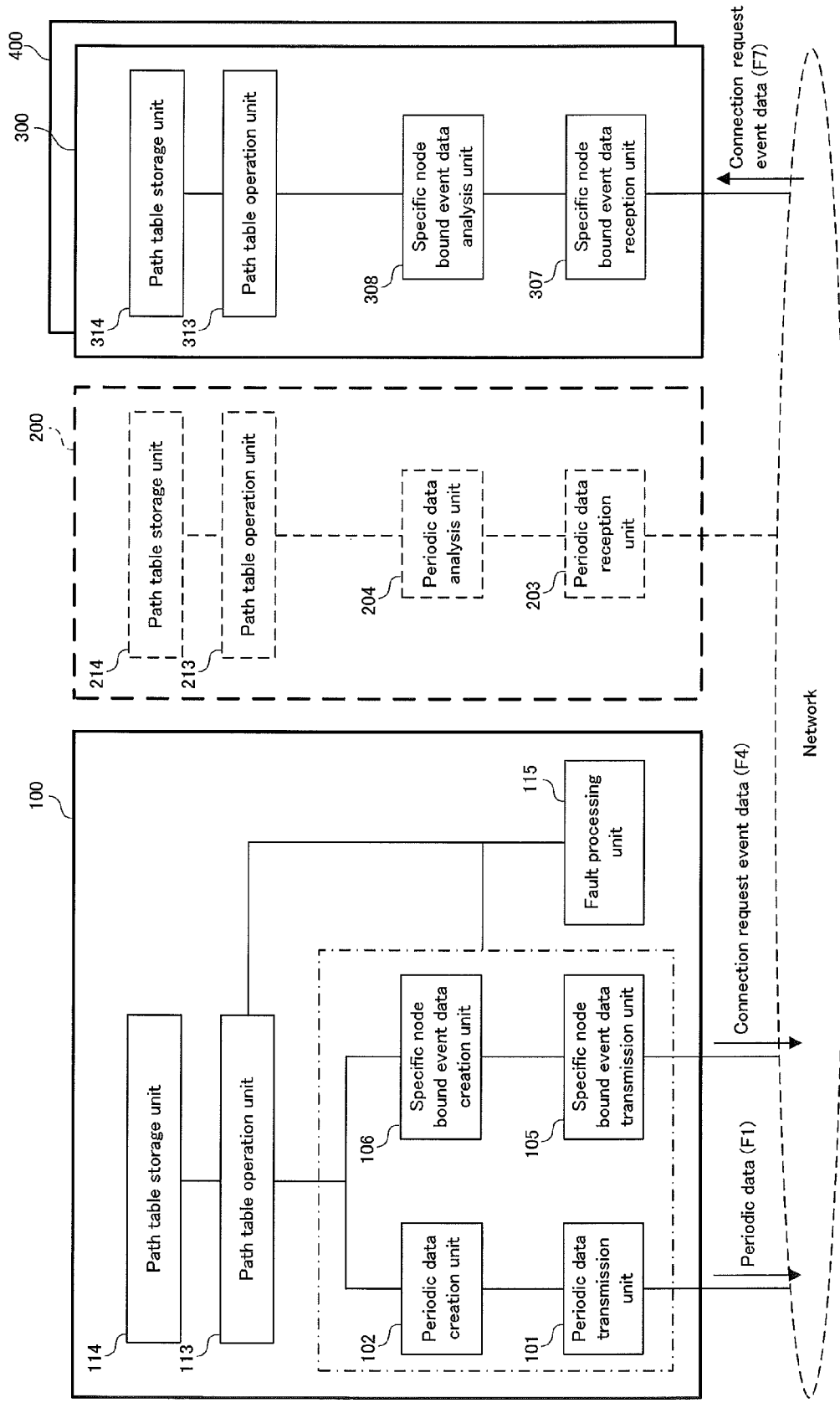
FIG. 34 is a diagram showing a flow of information in the network system in another case where a new path is constructed after the exit of a type-3i node in the network.
Figure 35:
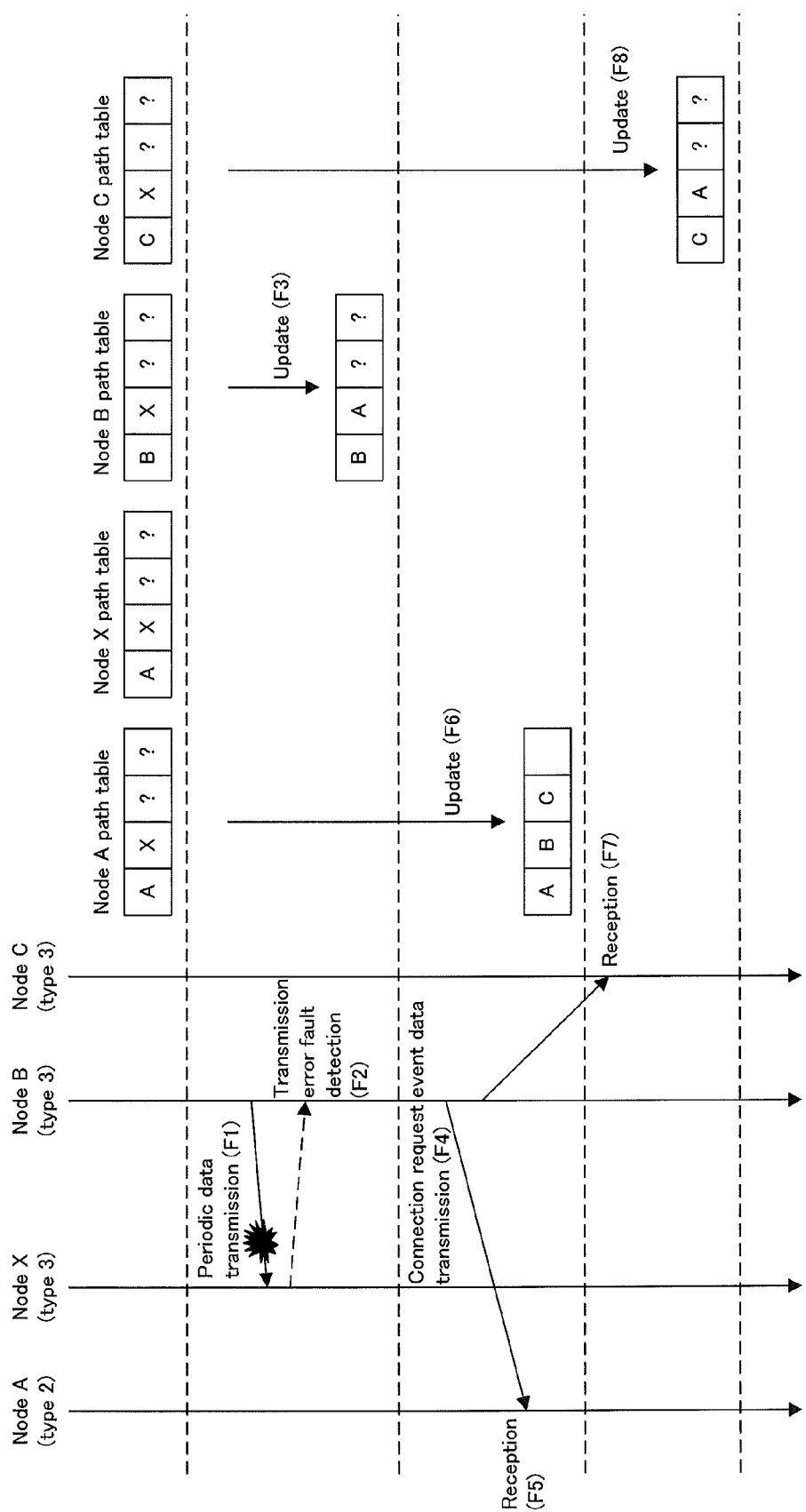
FIG. 35 is a diagram showing a sequence and transitions in path tables in another case where a new path is constructed after the exit of a type-3i node in the network.

The following describes the examples in FIGS. 31 to 33 using FIGS. 34 and 35. FIG. 34 is a diagram showing a flow of information in the network system in another case where a new path is constructed after the exit of a type-3i node in the network. FIG. 35 is a diagram showing a sequence and transitions in path tables in another case where a new path is constructed after the exit of a type-3i node in the network.

Among the configurations of the node 100 shown in FIG. 13, only the configurations necessary for the description given using FIG. 35 are shown in FIG. 34. Also, only the configurations necessary for the description given using FIG. 35 are shown in the nodes 200 to 400 as well. Moreover, among the function blocks of the nodes 100 to 400, function blocks whose reference numbers have the same last two digits are blocks that have the same functions. Furthermore, in FIG. 35, the node 100 is indicated as the node B, the node 200 is indicated as the node X, the node 300 is indicated as the node A, and the node 400 is indicated as the node C.

First, in the examples in FIGS. 34 and 35, it is assumed that a path exits between the node B and the node X, and that an abnormality has occurred in the node X. The node B is a type-3 node. The node B transmits periodic data created by the periodic data creation unit 102 from the periodic data transmission unit 101 to the node X (step F1).

Since an abnormality has occurred in the node X, the periodic data transmission unit 101 detects a fault based on a transmission error (step F2), and notifies abnormality information regarding the detected abnormality to the fault processing unit 115. The fault processing unit 115 acquires the path table of the node X from the path table information in the path table storage unit 114 (see FIG. 7) via the path table operation unit 113. Also, the fault processing unit 115 determines that the new connection destination is the node A based on the content of the acquired path table. Here, assume that the node A is a type-2 node, and that the node C is a type-3 node.

The fault processing unit 115 then updates the path table of the node B (step F3), and transfers the updated path table of the node B to the specific node bound event data creation unit 106. The specific node bound event data creation unit 106 creates connection request event data using the updated path table of the node B that was received. At this time, the specific node bound event data creation unit 106 stores the connection request event in the event key (see FIG. 7), and furthermore stores information regarding the faulty node that was detected (a value identifying the faulty node) in the fault information (see FIG. 7).

Next, the specific node bound event data creation unit 106 transmits the created connection request event data from the specific node bound event data transmission unit 105 to the node A and the node C (step F4).

Next, in the node A in the network, the specific node bound event data reception unit 307 receives the connection request event data (step F5). The specific node bound event data analysis unit 308 receives the connection request event data from the specific node bound event data reception unit 307, and analyzes it. In this example, the specific node bound event data analysis unit 308 determines that the event is a connection request event based on the event key in the data. Accordingly, the specific node bound event data analysis unit 308 updates the path table of the node A, which is stored in the path table storage unit 314, via the path table operation unit 313 (step F6).

Also, in the node C as well, similarly to the node A, reception processing (step F7) and update processing (step F8) are executed, and the path table of the node C is updated. As a result, after the exit of the node X, new paths are constructed between the node A and the node B and between the node A and the node C.

System Operations: Node Exit Processing (4)

Next, the exit of a type-3c node in the network system will be described using FIGS. 36 to 37.

Specifically, the following describes the case where out of the three nodes that are the connection destinations of the exiting type-3c node, one of them is a type-3i node, with reference to FIGS. 36 and 37. FIG. 36 is a diagram showing an example in which a type-3c node that has two type-3c nodes and one type-3i node as connection destinations exits the network. FIG. 36A shows an inter-node configuration and node path tables before the exit of the node, and FIG. 36B shows the inter-node configuration and node path tables after the exit of the node.

As shown in FIG. 36A, in the exiting type-3c node X, all of the connection destinations are type-3 nodes. Specifically, the connection destination nodes A and C are type-3c nodes, and the node B is a type-3i node. Accordingly, as shown in FIG. 36B, when the type-3c node X exits the network, the node A is cut off from the network, and the remaining nodes B and C construct a new path between themselves.

At this time, there is a possibility of a node connected to the node A being connected to the node B or the node C via several nodes, but the node A cannot become aware of this, and does not need to be aware of this.

In view of this, in this example, in this state, the node A can re-connect to the network including the node B and the node C. This point will be described below using FIG. 37. FIG. 37 is a diagram showing a case where a node that was disconnected from the network due to the exit of the node shown in FIG. 36 returns to the network. FIG. 37A shows the state before the exit, and FIG. 37B shows the state in which the node has returned to the network after the exit.

First, consider the connection destinations of the node A, the node B, and the node C, which are the connection destinations of the exiting node X. For example, as shown in FIGS. 37A and 37B, it is assumed that the node B is a type-3i node that includes a type-2 node as a connection destination.

When the node X exits, the node A, the node B, and the node C that are connection destinations of the node X detect the exit, but these three nodes do not know the node type of the nodes other than the own node. In view of this, when the node A, the node B, and the node C detect the exit of the node X, if the own node is not a type-3i node (node A, node C), the node enters a standby state without immediately performing new path creation processing. On the other hand, out of the node A, the node B, and the node C, if the own node is a type-3i node, a new path is established between the own node and one out of the two remaining nodes.

Specifically, as shown in FIG. 37B, the node B is a type-3i node, and therefore it establishes a new path 15 to the node C. Also, the node A that was disconnected from the network establishes a new path 16 to the type-2 node that is connected to the node B.

System Operations: Node Exit Processing (5)

Next, another example of the exit of a type-3c node in the network system will be described using FIGS. 38 to 40.

Specifically, the case where all three of the nodes that are connection destination nodes of an exiting type-3c node are type-3c nodes will be described using FIGS. 38 to 40. FIG. 38 is a diagram showing an example in which a type-3c node whose connection destinations are three type-3c nodes exits the network, wherein FIG. 38A shows an inter-node configuration before the exit of the node, and FIG. 38B shows the inter-node configuration after the exit of the node.

As shown in FIG. 38A, in the exiting type-3c node X, all of the connection destinations are type-3c nodes. Accordingly, a type-2 node does not exist in the range of the network shown in FIGS. 38A and 38B, and therefore when the node X exits as shown in FIG. 38B, three type-2 nodes are created, and the network becomes divided.

In view of this, in this example, first, in order to prevent division of the network, a provisional path is created by any two nodes out of the three nodes that became type-2 nodes. Thereafter, it is checked whether or a path that can replace the created provisional path exists, and if it exists, the provisional path is removed. This check processing will be described below with reference to FIGS. 39 and 40.

Figure 39B:
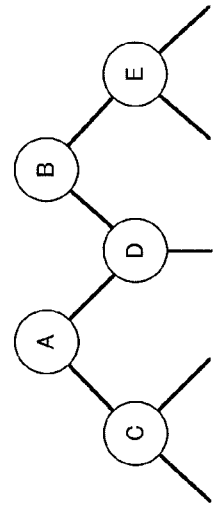
FIG. 39B is a diagram showing the check processing.
Figure 39A:
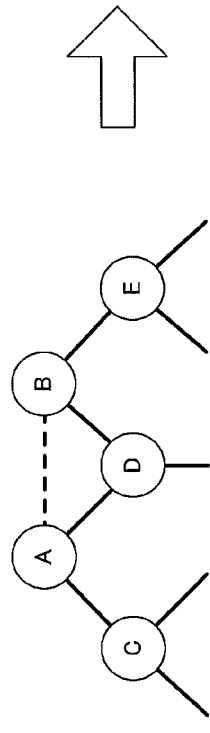
FIG. 39A is a diagram showing the provisional path creation processing.

FIG. 39 is a diagram illustrating an example of provisional path creation processing and check processing in the case of the disconnection of the nodes shown in FIG. 38. FIG. 39A is a diagram showing the state during execution of the provisional path creation processing and the check processing, and FIG. 39B is a diagram showing the state after the end of processing.

As shown in FIG. 39A, first a provisional path is created between the node A and the node B. Next, the node A and the node B use their path tables to check whether or not a common connection destination node exists.

As shown in FIGS. 39A and 39B, in this example, the node D exists as a common connection destination of the node A and the node B. Accordingly, a path between the node A and the node D and a path between the node B and the node D exist, therefore division of the network does not occur even if the provisional path between the node A and the node B is removed, and therefore the provisional path is removed.

FIG. 40 is a diagram illustrating another example of provisional path creation processing and check processing in the case of the disconnection of the node shown in FIG. 38. FIG. 40A is a diagram showing the state during execution of the provisional path creation processing and the check processing, and FIG. 40B is a diagram showing the state after the end of processing.

As shown in FIG. 40A, first a provisional path is created between the node A and the node B. Next, the node A and the node B use their path tables to check whether or not a common connection destination node exists, and it is assumed that a common connection destination node does not exist.

In this case, the node A and the node B each check whether or not a path that ultimately connects the node A and the node B via the connection destinations of the connection destination nodes exists. Specifically, the node A and the node B each check whether or not a path exists at least one out of between the node C and the node E, between the node C and the node F, between the node D and the node E, and between the node D and the node F. As shown in FIG. 40B, if a path exists, division of the network does not occur even if the provisional path between the node A and the node B is removed, and therefore the provisional path is removed.

Specifically, as shown in FIG. 40A, the node A confirms the existence of the cyclic path node A→node B→node E→node C→node A based on the path table of the node A (lower portion of FIG. 40A).

Also, the creation processing and the check processing shown in FIGS. 39 and 40 are performed for any path out of the paths between the node A and the node B, between the node B and the node C, and between the node C and the node A in FIG. 38. If the aforementioned path is confirmed between any two nodes, a new path is created between the one node (type-2) and the remaining node (type-2) out of the any two confirmed nodes.

Also, the creation of a path by the two type-2 nodes in this case may be performed by one of the type-2 nodes periodically transmitting path addition event data and searching for another type-2 node in the network, as was described using FIGS. 17 to 19.

System Operations: Node Exit Processing (6)

Next, the case where the node exiting the network system starts exit processing itself will be described using FIGS. 41 to 43.

FIG. 41 is a diagram showing an example in which a node in the network starts performing exit processing itself. FIG. 41A shows an inter-node configuration and node path tables before the exit of the node, and FIG. 41B shows the inter-node configuration and node path tables after the exit of the node.

As shown in FIGS. 41A and 41B, in the case where the type-2 node X performs an exit, a new path 17 is created between the node A and the node B that have paths to the node X.

The example in FIG. 41 will be described using FIGS. 42 and 43. FIG. 42 is a diagram showing the flow of information in the network system in the case where a node in the network starts performing exit processing itself. FIG. 43 is a diagram showing a sequence and transitions in path tables in the case where a node in the network starts performing self-exit processing.

Figure 42:
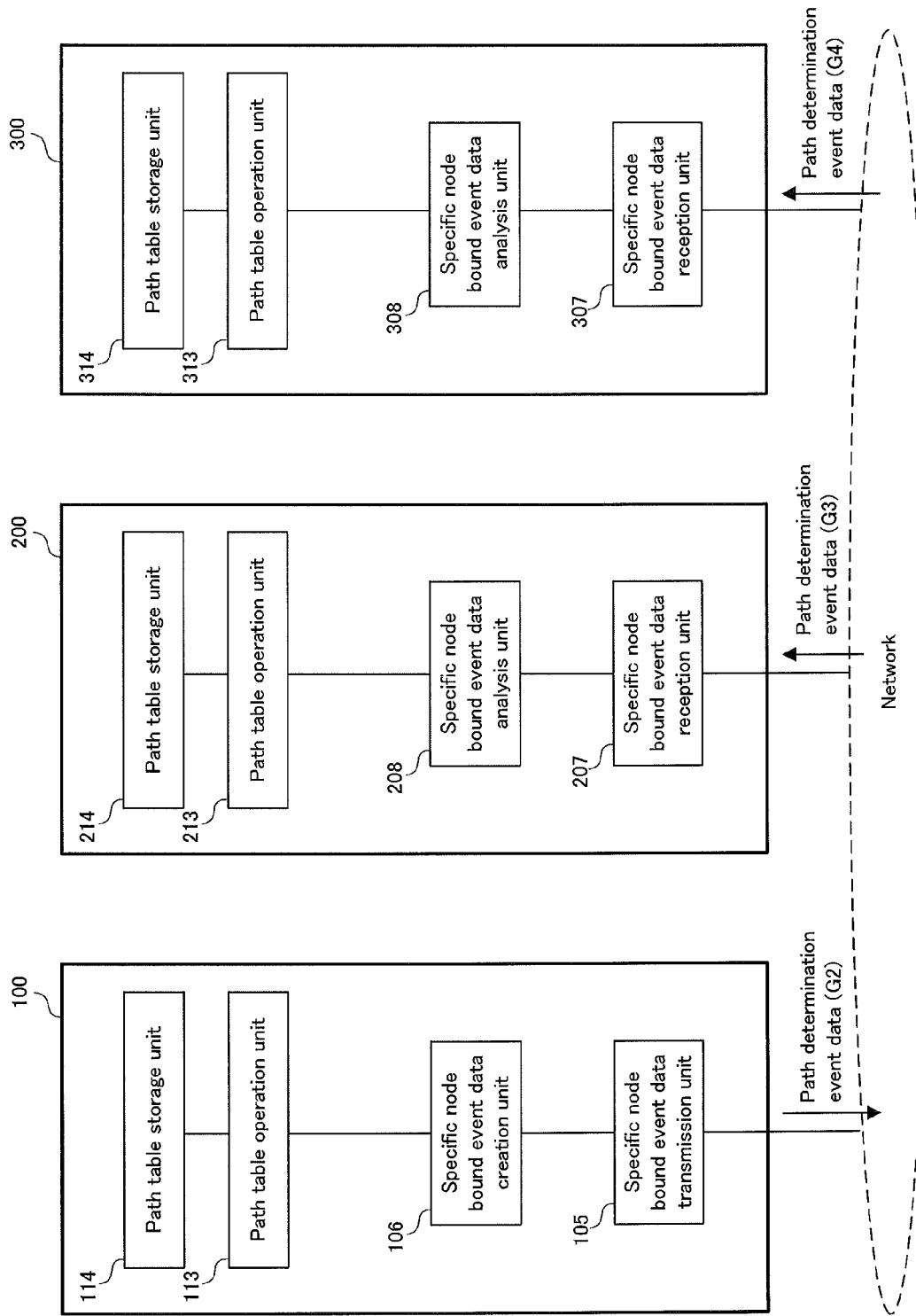
FIG. 42 is a diagram showing a flow of information in the network system in the case where a node in the network starts performing exit processing itself.
Figure 43:
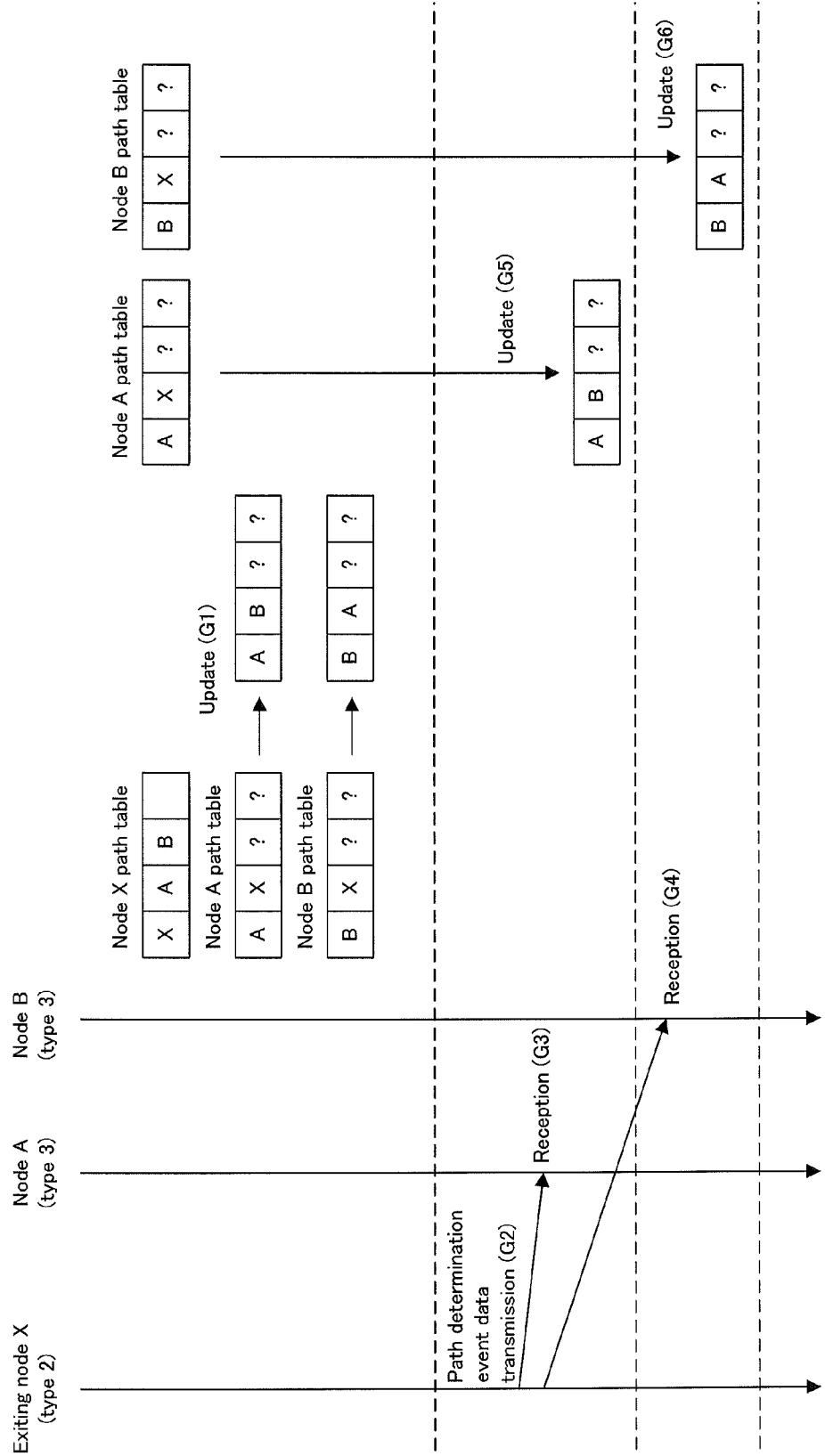
FIG. 43 is a diagram showing a sequence and transitions in path tables in the case where a node in the network starts performing exit processing itself.

Among the configurations of the node 100 shown in FIG. 13, only the configurations necessary for the description given using FIG. 43 are shown in FIG. 42. Also, only the configurations necessary for the description given using FIG. 43 are shown in the nodes 200 and 300 as well. Moreover, among the function blocks of the nodes 100 to 300, function blocks whose reference numbers have the same last two digits are blocks that have the same functions. Furthermore, in FIG. 43, the node 100 is indicated as the node X, the node 200 is indicated as the node A, and the node 300 is indicated as the node B.

As shown in FIG. 42, first the node X acquires the path table of the node X, the path table of the node A, and the path table of the node B from the path table information in the path table storage unit 114 via the path table operation unit 113. The path table operation unit 113 then updates the acquired path tables of the connection destination nodes (step G1).

Next, the specific node bound event data creation unit 106 stores a path determination event in the event key, and creates path determination event data based on the updated path table in accordance with the event data transmission destinations. The specific node bound event data creation unit 106 then transmits the path determination event data from the specific node bound event data transmission unit 105 to the transmission destination nodes (step G2).

Next, the specific node bound event data reception unit 207 of the node A, which is a reception destination of the path determination event data, receives the path determination event data (step G3). Then, in the node A, the specific node bound event data analysis unit 208 analyzes the data received from the specific node bound event data reception unit 207, and determines that the event is a path determination event based on the event key in the data.

Next, the specific node bound event data analysis unit 208 updates the path table information in the path table storage unit 214 via the path table operation unit 213 based on the path determination event data (step G5).

Similarly, the node B, which is a reception destination of the path determination event data, also executes reception processing (step G4) and path table information update processing (step G6).

As described above, after the node X has exited, a path is established between the node A and the node B. Note that also in the case where the exiting node is a type-3 node, a path is determined after the node has exited, and a post-exit path table is transmitted from the exit node to the connection destination nodes.

Effects of the Embodiment

As described above, in the present embodiment, the number of paths for each node is limited to two or three, and definitions are provided for the entrance of a node to the network. Accordingly, the amount of data in the path information regarding adjacent nodes that is managed by each node is fixed, and the creation of new paths when a node enters and when a node exits is automated in a logical manner.

Also, in the present embodiment, the path tables of connection destination nodes are included in the transmission data used in communication between nodes, and therefore information regarding connection destination nodes is always exchanged between nodes, and nodes check the connection states of paths in each other. This realizes autonomous control of node entrances and exits.

Program

It is sufficient that a program of the present embodiment is a program that causes a computer to execute the steps described above. A node of the present embodiment can be realized by installing this program in a computer and executing it.

In this case, the CPU (Central Processing Unit) of the computer functions as the specific node bound event data transmission unit, the specific node bound event data creation unit, the specific node bound event data reception unit, and the specific node bound event data analysis unit. Also, the CPU functions as the non-specific node bound event data transmission unit, the non-specific node bound event data creation unit, the non-specific node bound event data reception unit, and the non-specific node bound event data analysis unit as well. Furthermore, the CPU functions as the path table operation unit and the fault processing unit as well. Also, a storage apparatus such as a hard disk included in the computer functions as the path table storage unit.

Figure 44:
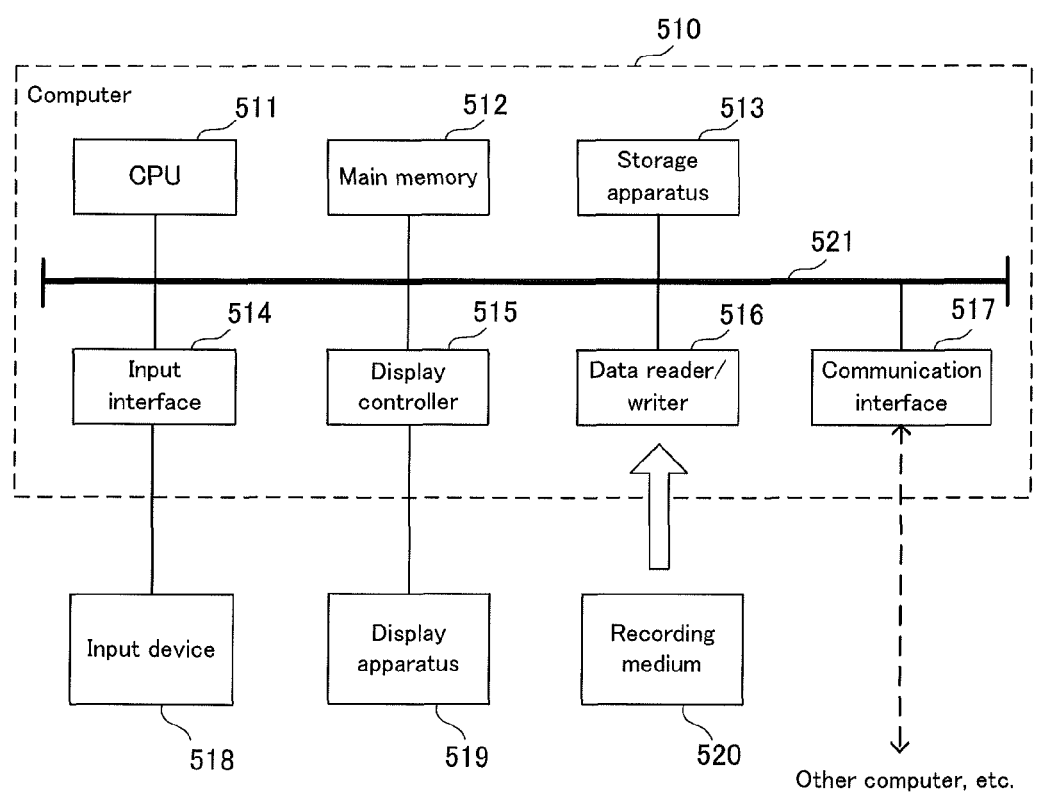
FIG. 44 is a block diagram showing an example of a computer that realizes a node in an embodiment of the present invention.

A computer that realizes a node by executing the program of the present embodiment will be described below using FIG. 44. FIG. 44 is a block diagram showing an example of a computer that realizes a node in the embodiment of the present invention.

As shown in FIG. 44, a computer 510 includes a CPU 511, a main memory 512, a storage apparatus 513, an input interface 514, a display controller 515, a data reader/writer 516, and a communication interface 517. These units are connected via a bus 521 such that data communication between them is possible.

The CPU 511 loads programs (code) of the present embodiment, which are stored in the storage apparatus 513, to the main memory 512, and carries out various types of operations by executing portions of the program in a predetermined sequence. The main memory 512 is typically a volatile storage apparatus such as a DRAM (Dynamic Random Access Memory). Also, the program of the present embodiment is provided in a state of being stored in a computer-readable recording medium 520. Note that the program of the present embodiment may be distributed over the Internet, with which a connection is established via the communication interface 517.

Also, besides a hard disk, specific examples of the storage apparatus 513 include a semiconductor storage apparatus such as a flash memory. The input interface 514 mediates the transmission of data between the CPU 511 and an input device 518 such as a keyboard or a mouse. The display controller 515 is connected to a display apparatus 519, and controls display performed by the display apparatus 519.

The data reader/writer 516 mediates the transmission of data between the CPU 511 and the recording medium 520, and executes the reading out of programs from the recording medium 520 and the writing of the results of processing performed in the computer 510 to the recording medium 520. The communication interface 517 mediates the transmission of data between the CPU 511 and other computers.

Also, specific examples of the recording medium 520 include general semiconductor storage devices such as a CF (Compact Flash (registered trademark)) card and an SD (Secure Digital) card, a magnetic storage medium such as a flexible disk, and an optical storage medium such as a CD-ROM (Compact Disk Read Only Memory).

The embodiment described above can be partially or wholly realized by Supplementary Notes 1 to 20 described below, but is not limited to the following descriptions.

Supplementary Note 1

A system having a network that comprises a plurality of nodes, the plurality of nodes each comprising:
a path table storage unit that stores path table information for specifying a connection destination of said node and for limiting the number of connection destinations; and
a path table operation unit that rewrites content in the path table information,
wherein in each of the plurality of nodes, if said node enters the network, if a node to be directly connected to said node entered the network, and if a node directly connected to said node exited the network, the path table operation unit updates the path table information in said node and constructs a new path in the network system.

Supplementary Note 2

The network system according to Supplementary Note 1, wherein in each of the plurality of nodes, the path table information includes an own-node path table for specifying a node that is directly connected to said node, and an other-node path table for specifying a node that is connected to each other node directly connected to said node.

Supplementary Note 3

The network system according to Supplementary Note 1 or 2, wherein the plurality of nodes each further comprising:
a non-specific node bound event data creation unit that creates node entrance event data including the own-node path table included in the path table information, for entrance to the network; and
a non-specific node bound event data transmission unit that transmits the node entrance event data to a node other than said node,
wherein if, after transmission of the node entrance event data, said node received candidate node event data that includes an own-node path table from a node other than said node, the path table operation unit updates the path table information in said node based on the received own-node path table, and constructs a new path between said node and the node other than said node.

Supplementary Note 4

The network system according to Supplementary Note 3, wherein the plurality of nodes each further comprise:
an event data analysis unit that, if said node received the node entrance event data from a node other than said node, determines whether or not to permit entrance of the node that is a reception origin;
a specific node bound event data creation unit that, if entrance of the reception origin node is permitted, creates the candidate node event data that includes an own-node path table; and
a specific node bound event data transmission unit that transmits the candidate node event data to the reception origin node,
wherein in each of the plurality of nodes, the path table operation unit updates the path table information in said node based on an own-node path table that was received from the reception origin node after transmission of the candidate node event data, and constructs a new path between said node and the reception origin node.

Supplementary Note 5

The network system according to any of Supplementary Notes 1 to 4,
wherein the plurality of nodes each further comprise a fault processing unit that, if a node connected to said node exits the network due to a fault, specifies a new connection destination based on the path table information, and
in each of the plurality of nodes, if a new connection destination was specified by the fault processing unit, the path table operation unit updates the path table information based on the new connection destination that was specified.

Supplementary Note 6

A node that constructs a network that comprises a plurality of nodes,
said node comprising:
a path table storage unit that stores path table information for specifying a connection destination of itself and for limiting the number of connection destinations; and
a path table operation unit that rewrites content in the path table information,
wherein if said node enters the network, if a node to be directly connected to said node entered the network, and if a node directly connected to said node exited the network, the path table operation unit updates the path table information and constructs a new path in the network.

Supplementary Note 7

The node according to Supplementary Note 6,
wherein the path table information includes an own-node path table for specifying a node that is directly connected to said node, and an other-node path table for specifying a node that is connected to each other node directly connected to said node.

Supplementary Note 8

The node according to Supplementary Note 6 or 7, further comprising:

a non-specific node bound event data creation unit that creates node entrance event data including the own-node path table included in the path table information, for entrance to the network; and a non-specific node bound event data transmission unit that transmits the node entrance event data to a node other than said node, wherein if, after transmission of the node entrance event data, said node received candidate node event data that includes an own-node path table from a node other than said node, the path table operation unit updates the path table information in said node based on the received own-node path table, and constructs a new path between said node and the node other than said node.

Supplementary Note 9

The node according to Supplementary Note 8, further comprising:

an event data analysis unit that, if said node received the node entrance event data from a node other than said node, determines whether or not to permit entrance of the node that is a reception origin;

a specific node bound event data creation unit that, if entrance of the reception origin node is permitted, creates the candidate node event data that includes an own-node path table; and a specific node bound event data transmission unit that transmits the candidate node event data to the reception origin node, wherein the path table operation unit updates the path table information in said node based on an own-node path table that was received from the reception origin node after transmission of the candidate node event data, and constructs a new path between said node and the reception origin node.

Supplementary Note 10

The node according to any of Supplementary Notes 6 to 9, further comprising:

a fault processing unit that, if a node connected to said node exits the network due to a fault, specifies a new connection destination based on the path table information, wherein if a new connection destination was specified by the fault processing unit, the path table operation unit updates the path table information based on the new connection destination that was specified.

Supplementary Note 11

A network management method in a network system that comprises a plurality of nodes, the method comprising:

(a) a step of, in each of the plurality of nodes, if said node enters the network, if a node to be directly connected to said node entered the network, and if a node directly connected to said node exited the network, updating path table information that specifies a connection destination of said node and limits the number of connection destinations, and constructing a new path in the network system.

Supplementary Note 12

The network management method according to Supplementary Note 11, wherein in each of the plurality of nodes, the path table information includes an own-node path table for specifying a node that is directly connected to said node, and an other-node path table for specifying a node that is connected to each other node directly connected to said node.

Supplementary Note 13

The network management method according to Supplementary Note 11 or 12, further having:

(b) a step of, in each of the plurality of nodes, creating node entrance event data including the own-node path table included in the path table information, for entrance to the network, and transmitting the node entrance event data to a node other than said node, wherein in step (a), if, after transmission of the node entrance event data, said node received candidate node event data that includes an own-node path table from a node other than said node, the path table information in said node is updated based on the received own-node path table, and a new path is constructed between said node and the node other than said node.

Supplementary Note 14

The network management method according to Supplementary Note 13, further comprising:

(c) a step of, in each of the plurality of nodes, if the node entrance event data was received from a node other than said node, determining whether or not to permit entrance of the node that is a reception origin;

(d) a step of, in each of the plurality of nodes, if entrance of the reception origin node is permitted in step (c), creating the candidate node event data that includes an own-node path table; and (e) a step of, in each of the plurality of nodes, transmitting the candidate node event data that was created in step (d) to the reception origin node, wherein in step (a), the path table information in said node is updated based on an own-node path table that was received from the reception origin node after transmission of the candidate node event data, and a new path is constructed between said node and the reception origin node.

Supplementary Note 15

The network management method according to any of Supplementary Notes 11 to 14, further comprising:

(f) a step of, in each of the plurality of nodes, if a node connected to said node exits the network due to a fault, specifying a new connection destination based on the path table information, wherein if a new connection destination was specified in step (f), the path table information is updated in step (a) based on the new connection destination that was specified.

Supplementary Note 16

A computer-readable recording medium having recorded thereon a program for causing a computer to function as a node that constructs a network that comprises a plurality of nodes, the program including instructions for causing the computer to execute:

(a) a step of, if said node enters the network, if a node to be directly connected to said node entered the network, and if a node directly connected to said node exited the network, updating path table information that specifies a connection destination of said node and limits the number of connection destinations, and constructing a new path in the network system.

Supplementary Note 17

The computer-readable recording medium according to Supplementary Note 16, wherein the path table information includes an own-node path table for specifying a node that is directly connected to said node, and an other-node path table for specifying a node that is connected to each other node directly connected to said node.

Supplementary Note 18

The program according to Supplementary Note 16 or 17, further including instructions for causing the computer to execute:

(b) a step of creating node entrance event data including the own-node path table included in the path table information, for entrance to the network, and transmitting the node entrance event data to a node other than said node, wherein in step (a), if, after transmission of the node entrance event data, said node received candidate node event data that includes an own-node path table from a node other than said node, the path table information in said node is updated based on the received own-node path table, and a new path is constructed between said node and the node other than said node.

Supplementary Note 19

The program according to Supplementary Note 18, further including instructions for causing the computer to execute:

(c) a step of, in said node, if the node entrance event data was received from a node other than said node, determining whether or not to permit entrance of the node that is a reception origin;

(d) a step of, if entrance of the reception origin node is permitted in step (c), creating the candidate node event data that includes an own-node path table; and (e) a step of transmitting the candidate node event data to the reception origin node, wherein in step (a), the path table information in said node is updated based on an own-node path table that was received from the reception origin node after transmission of the candidate node event data, and a new path is constructed between said node and the reception origin node.

Supplementary Note 20

The program according to any of Supplementary Notes 16 to 19, further including instructions for causing the computer to execute:

(f) a step of, if a node connected to said node exits the network due to a fault, specifying a new connection destination based on the path table information, wherein if a new connection destination was specified in step (f), the path table information is updated in step (a) based on the new connection destination that was specified.

Although the present invention has been described above with reference to embodiments, the present invention is not limited to the above embodiments. The configuration and details of the present invention can be modified in various ways comprehendible by a person skilled in the art within the scope of the present invention.

This application is based upon and claims the benefit of priority from Japanese patent application No. 2013-043742, filed on Mar. 6, 2013, the disclosure of which is incorporated herein in its entirety.

INDUSTRIAL APPLICABILITY

As described above, according to the present invention, a new communication path can be autonomously constructed both when a node enters and when a node exits, while also suppressing an increase in the processing load in the network. The present invention is effective in a network that includes many nodes.

REFERENCE SIGNS LIST

1 Node
2 Path
3 Path
4 Path
5 Path
6 Path
7 Path
8 Path
10 Path table information
11 Own-node path table
12-14 Other-node path table
15 Path
16 Path
17 Path
20 Path information
21 Path information
22 Path information
23 Path information
24 Path information
25 Path information
26, 27 Connection request event data field
28, 29 Blank field in path information
30 Path information
31 Path information
32 Path information
33 Blank area
34, 35 Field in path information
36 Path information
37 Path information
38 Field
39 Field
40 Field
41 Field
50 Path information
51 Path information
52 Field
53 Field
54 Path information
55 Path information
56 Path information
59 Field
60 Path information
61 Path information
62 Path information
63 Field
100 Node
101 Periodic data transmission unit
102 Periodic data creation unit
103 Periodic data reception unit
104 Periodic data analysis unit
105 Specific node bound event data transmission unit
106 Specific node bound event data creation unit
107 Specific node bound event data reception unit
108 Specific node bound event data analysis unit
109 Non-specific node bound event data transmission unit
110 Non-specific node bound event data creation unit
111 Non-specific node bound event data reception unit
112 Non-specific node bound event data analysis unit
113 Path table operation unit
114 Path table storage unit
115 Fault processing unit
213 Path table operation unit
214 Path table storage unit
200 Node
300 Node
313 Path table operation unit
314 Path table storage unit
400 Node
413 Path table storage unit
414 Path table operation unit
500 Network system
510 Computer
511 CPU
512 Main memory
513 Storage apparatus
514 Input interface
515 Display controller
516 Data reader/writer 517 Communication interface
518 Input device
519 Display apparatus
520 Recording medium
521 Bus

The invention claimed is:

1. A system, comprising:
a network comprising a plurality of nodes each comprising
a path table storage unit that stores path table information for specifying a connection destination of said node and for limiting the number of connection destinations,
a path table operation unit that rewrites content in the path table information,
a non-specific node bound event data creation unit that creates node entrance event data including an own-node path table included in the path table information, for entrance to the network, and
a non-specific node bound event data transmission unit that transmits the node entrance event data to a node other than said node,
wherein in each of the plurality of nodes, when said node enters the network, when a node to be directly connected to said node entered the network, and when a node directly-connected to said node exited the network, the path table operation unit updates the path table information in said node and constructs a new path in the network system,
wherein in each of the plurality of nodes, the path table information includes the own-node path table for specifying a directly-connected node that is directly connected to said node, and an other-node path table for specifying an indirectly-connected node that is connected to each directly-connected node that is directly connected to said node, and
wherein in each of the plurality of nodes, when, after transmission of the node entrance event data, said node received candidate node event data that includes an own-node path table from a node other than said node, the path table operation unit updates the path table information in said node based on the received own-node path table, and constructs a new path between said node and the node other than said node.

2. The network system according to claim 1, wherein the plurality of nodes each further comprise a specific node bound event data creation unit that, when entrance of the reception origin node is permitted, creates the candidate node event data that includes an own-node path table, and a specific node bound event data transmission unit that transmits the candidate node event data to the reception origin node, and wherein in each of the plurality of nodes, the path table operation unit updates the path table information in said node based on an own-node path table that was received from the reception origin node after transmission of the candidate node event data, and constructs a new path between said node and the reception origin node.

3. The network system according to claim 1, wherein the plurality of nodes each further comprise a fault processing unit that, when a node connected to said node exits the network due to a fault, specifies a new connection destination based on the path table information, and wherein in each of the plurality of nodes, when a new connection destination was specified by the fault processing unit, the path table operation unit updates the path table information based on the new connection destination that was specified.

4. A network management method in a network system that comprises a plurality of nodes, the method comprising: in each of the plurality of nodes, when said node enters the network, when a node to be directly connected to said node entered the network, and when a node directly connected to said node exited the network, updating path table information that specifies a connection destination of said node and limits the number of connection destinations, and constructing a new path in the network system, wherein in each of the plurality of nodes, the path table information includes an own-node path table for specifying a node that is directly connected to said node, and an other-node path table for specifying a node that is connected to each other node directly connected to said and after transmission of node entrance event data including the own-node path table included in the path table information, for entrance to the network, to a node other than said node, said node received candidate node event data that includes an own-node path table from the node other than said node, the path table information is updated in said node based on the received own-node path table, and constructs a new path between said node and the node other than said node.

5. A non-transitory computer-readable recording medium having recorded thereon a program for causing a computer to function as a node that constructs a network that comprises a plurality of nodes, the program including instructions for causing the computer to execute: when said node enters the network, when a node to be directly connected to said node entered the network, and when a node directly connected to said node exited the network, updating path table information that specifies a connection destination of said node and limits the number of connection destinations, and constructing a new path in the network system, wherein in each of the plurality of nodes, the path table information includes an own-node path table for specifying a node that is directly connected to said node, and an other-node path table for specifying a node that is connected to each other node directly connected to said
and wherein in each of the plurality of nodes, when, after transmission of node entrance event data including the own-node path table included in the path table information, for entrance to the network, to a node other than said node, said node received candidate node event data that includes an own-node path table from the node other than said node, the path table information is updated in said node based on the received own-node path table, and constructs a new path between said node and the node other than said node.

6. The network system according to claim 1, wherein the plurality of nodes each further comprise a fault processing unit that, when a node connected to said node exits the network due to a fault, specifies a new connection destination based on the path table information, and wherein in each of the plurality of nodes, when a new connection destination was specified by the fault processing unit, the path table operation unit updates the path table information based on the new connection destination that was specified.

7. The network system according to claim 2, wherein the plurality of nodes each further comprise a fault processing unit that, when a node connected to said node exits the network due to a fault, specifies a new connection destination based on the path table information, and wherein in each of the plurality of nodes, when a new connection destination was specified by the fault processing unit, the path table operation unit updates the path table information based on the new connection destination that was specified.

* * * * *